United States Patent
Cho et al.

(10) Patent No.: US 12,501,189 B2
(45) Date of Patent: Dec. 16, 2025

(54) REGION OF INTEREST SAMPLING AND RETRIEVAL FOR ARTIFICIAL REALITY SYSTEMS

(71) Applicant: Meta Platforms Technologies, LLC, Menlo Park, CA (US)

(72) Inventors: Taehee Cho, Palo Alto, CA (US); Jixu Chen, Redwood City, CA (US); Jeffrey Hung Wong, San Francisco, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 195 days.

(21) Appl. No.: 18/447,225

(22) Filed: Aug. 9, 2023

(65) Prior Publication Data

US 2024/0073564 A1 Feb. 29, 2024

Related U.S. Application Data

(60) Provisional application No. 63/402,786, filed on Aug. 31, 2022.

(51) Int. Cl.
*H04N 25/78* (2023.01)
*G06F 3/01* (2006.01)
(Continued)

(52) U.S. Cl.
CPC ............. *H04N 25/78* (2023.01); *G06F 3/013* (2013.01); *G06T 3/4053* (2013.01); *G06T 7/70* (2017.01);
(Continued)

(58) Field of Classification Search
CPC .... H04N 13/383; H04N 25/443; H04N 25/47; H04N 25/78; G06T 3/4053; G06T 7/70;
(Continued)

(56) References Cited

U.S. PATENT DOCUMENTS

| | | |
|---|---|---|
| 6,837,432 B2 | 1/2005 | Tsikos et al. |
| 11,275,962 B2 | 3/2022 | Wang et al. |

(Continued)

FOREIGN PATENT DOCUMENTS

| | | |
|---|---|---|
| JP | 2005149001 A | 6/2005 |
| JP | 2015171097 A | 9/2015 |
| JP | 2019114067 A | 7/2019 |

*Primary Examiner* — Lin Ye
*Assistant Examiner* — Chriss S Yoder, III
(74) *Attorney, Agent, or Firm* — Freestone Intellectual Property Law PLLC; Aaron J. Visbeek

(57) ABSTRACT

An imaging device is configured to perform eye tracking. The imaging device comprises an image sensor and an image controller. The image sensor is configured to capture an image of a portion of a user's face. The image controller is configured to: in a first-access step, read out a set of sample pixels, from the image sensor to main memory; identify a pixel of interest from the set of sample pixels and a location of the pixel of interest; in a second-access step, read out remaining pixels in a photodetector group of interest corresponding to the location of the pixel of interest, from the image sensor to the main memory; generate a high-resolution region of interest by combining the pixel of interest and the remaining pixels in the photodetector group; and perform gaze estimation using the full resolution region of interest.

20 Claims, 19 Drawing Sheets

(51) Int. Cl.
*G06T 3/4053* (2024.01)
*G06T 7/70* (2017.01)
*H04N 13/383* (2018.01)

(52) U.S. Cl.
CPC . *H04N 13/383* (2018.05); *G06T 2207/20081* (2013.01); *G06T 2207/30201* (2013.01)

(58) Field of Classification Search
CPC . G06T 2207/20081; G06T 2207/30201; G06F 3/013
See application file for complete search history.

(56) References Cited

U.S. PATENT DOCUMENTS

| | | | | |
|---|---|---|---|---|
| 2013/0088583 | A1* | 4/2013 | Northcott | G06V 40/19 |
| | | | | 348/78 |
| 2018/0270436 | A1* | 9/2018 | Ivarsson | H04N 25/131 |
| 2023/0171481 | A1* | 6/2023 | Ogino | H04N 23/698 |
| | | | | 348/78 |

* cited by examiner

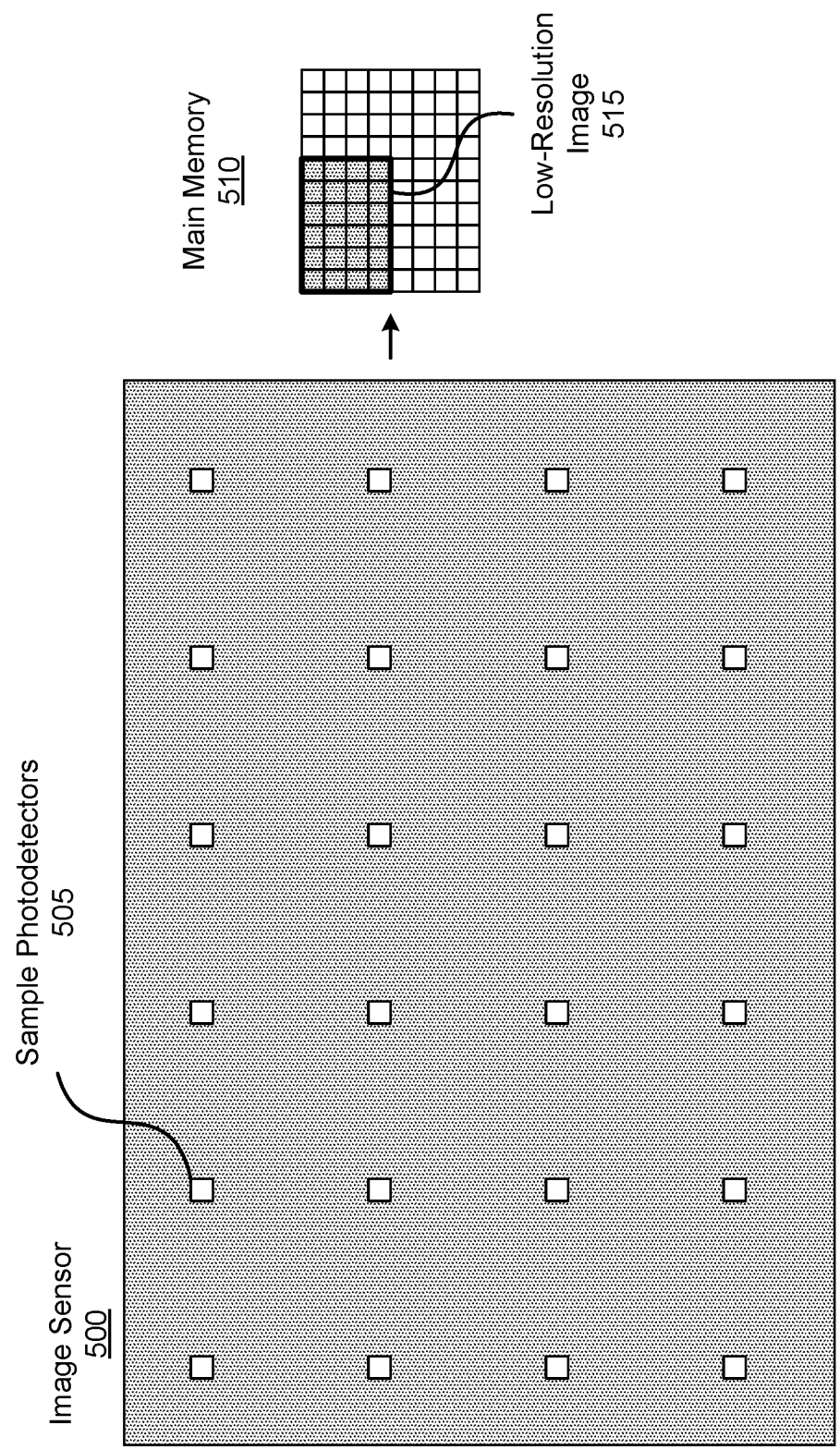

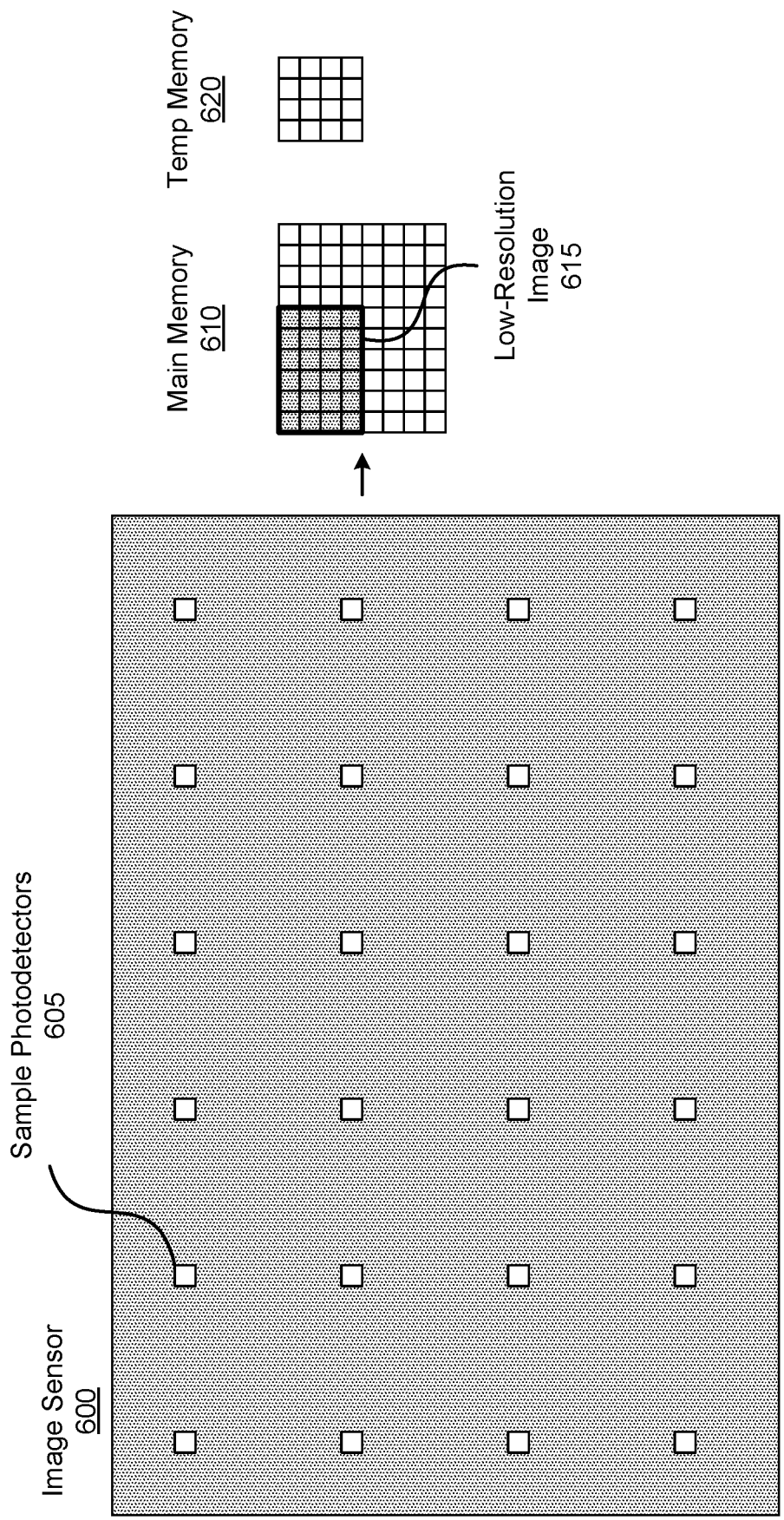

REGION OF INTEREST SAMPLING AND RETRIEVAL FOR ARTIFICIAL REALITY SYSTEMS

CROSS-REFERENCE TO RELATED APPLICATIONS

This application claims the benefit of U.S. Provisional Application No. 63/402,786 filed on Aug. 31, 2022, which is incorporated by reference in its entirety.

FIELD OF THE INVENTION

This disclosure relates generally to artificial reality systems, and more specifically to eye tracking and/or object tracking by artificial reality systems.

BACKGROUND

Artificial reality systems generally utilize a headset to present artificial reality content including visual content to a user. In order to provide realistic content to the user, the artificial reality system implements one or more imaging devices to track objects of interest. As one example, an imaging device may be deployed internally towards a face of the user to track the user's facial features (e.g., eyes, eyebrows, mouth, other facial features, etc.). As another example, an imaging device may be deployed externally towards the local area of the headset. The imaging device may track external objects and/or other body parts of the user (e.g., hands, arms, feet, legs, torso, etc.). Such imaging devices generally require continuously capturing sufficiently high resolution to capture sufficient details in the object for tracking. Such continuous high-resolution image capture burdens computations resources and drains battery life.

SUMMARY

An imaging device is configured to capture images and to generate high-resolution regions of interest focused on objects of interest to minimize computing resources and power consumption. The imaging device captures, via an image sensor comprising photodetectors (e.g., photodiodes), a full-resolution image (e.g., a face of a user) described by pixel data captured by the photodetectors. The imaging device performs region of interest sampling and retrieval to generate the one or more high-resolution regions of interest from pixel data for a subset of the photodetectors. Region of interest sampling and retrieval may entail a two-step access of pixel data from the image sensor to retrieve a high-resolution region of interest from the image sensor, which is smaller than the full-resolution image captured by the image sensor (i.e., a cropped portion of the full-resolution image). In the first-access step, an image controller retrieves a set of sample pixels, i.e., pixel data from a sample set of photodetectors, from the image sensor to main memory, yielding a low-resolution sample of the full-size image captured by the image sensor. The image controller identifies one or more pixels of interest from the set of sample pixels and locations of those pixels of interest. The image controller may transfer the one or more pixels of interest into their final positions in the main memory or into temporary memory. In the second-access step, the image controller identifies one or more photodetector groups of interest (e.g., of some portion of the face) corresponding to the locations of the one or more pixels of interest. The image controller can retrieve the pixel data from the photodetector groups of interest. In some embodiments, the image controller can read out all pixels of the photodetectors in the photodetector groups of interest. In other embodiments, the image controller can read out the remaining pixels, i.e., the pixel data in the remaining photodetectors in those one or more photodetector groups of interest (excluding sample photodetectors), from the image sensor to the main memory. In yet other embodiments, the image controller can read out a denser sampling of pixel data from the photodetector groups of interest. The image controller generates one or more high-resolution regions of interest that encompass the object(s) of interest with the read-out pixel data. In some embodiments, each high-resolution region of interest is generated by combining the pixel of interest and the remaining pixels in the photodetector group of interest. The image controller may perform object tracking (e.g., gaze estimation). In some embodiments, the image controller may provide the high-resolution region of interest to another computing device for object tracking, gaze estimation, etc.

In some embodiments, a method is described for object tracking (e.g., face tracking, gaze estimation, etc.). The method comprises capturing an image of a portion of a user's face with an image sensor of an imaging device; in a first-access step, reading out a set of sample pixels, from the image sensor to main memory of an image controller. The method comprises identifying, via the image controller, a pixel of interest from the set of sample pixels and a location of the pixel of interest. The method comprises, in a second-access step, reading out remaining pixels in a photodetector group of interest corresponding to the location of the pixel of interest, from the image sensor to the main memory of the image controller. The method comprises generating, via the image controller, the high-resolution region of interest by combining the pixel of interest and the remaining pixels in the photodetector group of interest. The method comprises performing, via the image controller, gaze estimation using the high-resolution region of interest.

In some embodiments, an imaging device is described for object tracking (e.g., gaze estimation) the imaging device comprising an image sensor and an image controller. The image sensor comprises a plurality of photodetectors and is configured to capture an image of a portion of a user's face. The image controller is configured to, in a first-access step, read out a set of sample pixels, from the image sensor to main memory. The image controller is configured to identify a pixel of interest from the set of sample pixels and a location of the pixel of interest. The image controller is configured to, in a second-access step, read out remaining pixels in a photodetector group of interest corresponding to the location of the pixel of interest, from the image sensor to the main memory. The image controller is configured to generate a high-resolution region of interest by combining the pixel of interest and the remaining pixels in the photodetector group of interest. The image controller is configured to perform gaze estimation using the high-resolution region of interest.

BRIEF DESCRIPTION OF THE DRAWINGS

FIG. 5A illustrates a second implementation of region of interest sampling and retrieval, in particular sampling of photodetector groups, in accordance with one or more embodiments.

FIG. 6A illustrates a third implementation of region of interest sampling and retrieval, in particular sampling of photodetector groups, in accordance with one or more embodiments.

Figure 1A:
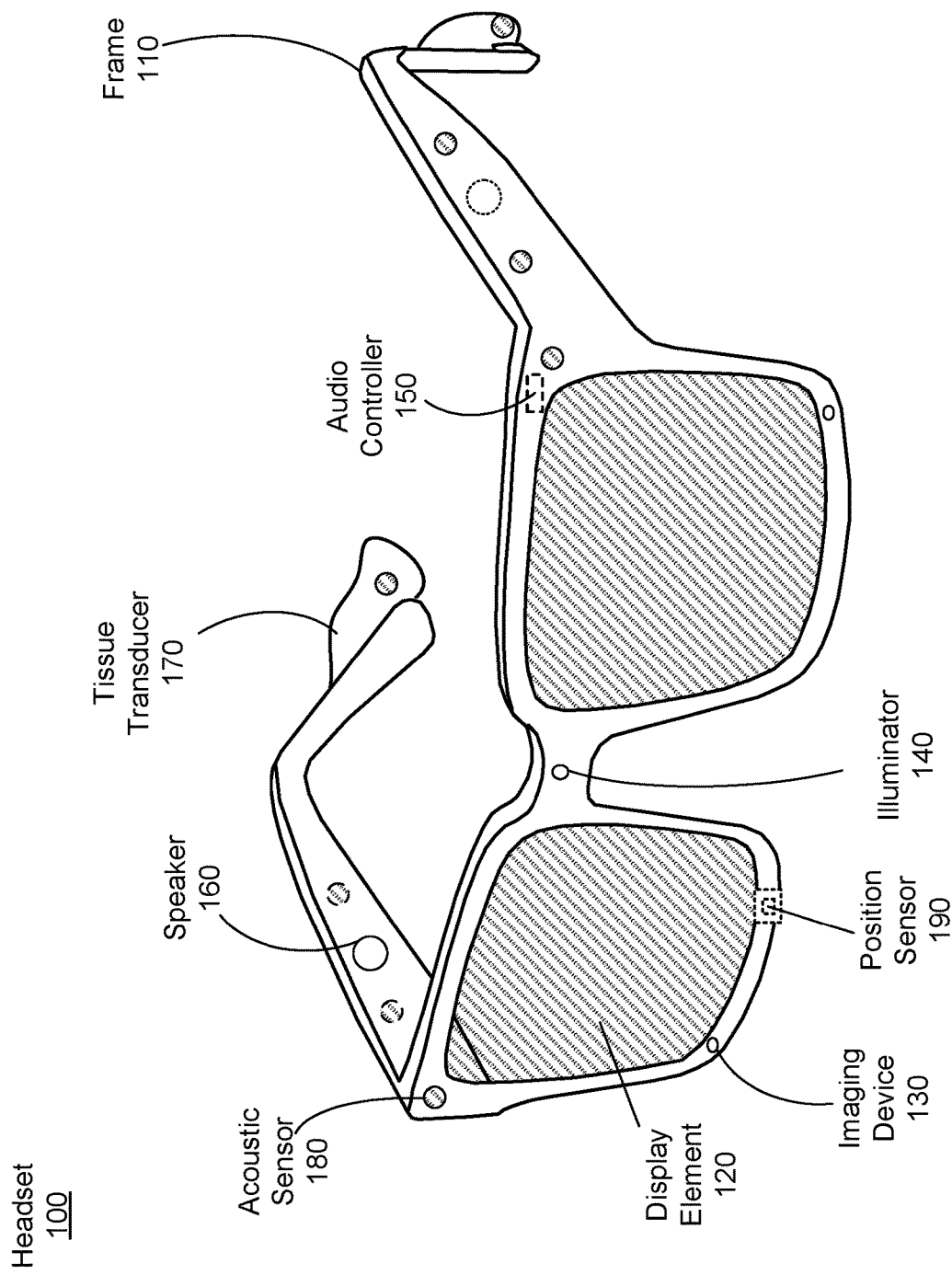
FIG. 1A is a perspective view of a headset implemented as an eyewear device, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

An artificial reality system utilizes one or more imaging devices to capture images for object tracking. For example, a headset implemented in the artificial reality system may utilize an imaging device to capture images of a user's eyers for eye tracking. In other examples, the headset may utilize an imaging device to capture images of an object in the local area. To accomplish the object tracking, the artificial reality system may continuously capture images with the one or more imaging devices to capture up-to-date locations of the objects of interest.

The artificial reality system implements region of interest sampling and retrieval to generate one or more high-resolution regions of interest with an imaging device. Region of interest sampling and retrieval saves computing resources and computing time by limiting the total number of photodetectors accessed. Region of interest sampling and retrieval generally entails a two-step access of pixel data on an image sensor of the imaging device to retrieve a high-resolution region of interest from the image sensor, which may be smaller than the full-size image captured by the image sensor. A full-resolution image refers to an image described by pixel data captured by all the photodetectors of the image sensor. A down-sampled image (also referred to as a "sample image") refers to a low-resolution image described by sample pixels captured by sample photodetectors of photodetector groups that subdivide the image sensor. A high-resolution region of interest is a cropped portion of the image captured by the entire image sensor that is generated by combining an identified pixel of interest (e.g., identified from sample pixels) and remaining pixels in a photodetector group of interest corresponding to the identified pixel of interest.

In the first-access step, an image controller of the imaging device retrieves pixel data from a sample set of photodetectors (e.g., photodetectors) from the image sensor, yielding a low-resolution sample of the image captured by the image sensor. The image controller identifies one or more pixels of interest from the low-resolution sample of the image and locations of those pixels of interest. The image controller may transfer the one or more pixels of interest into their final positions in the main memory or into temporary memory. In the second-access step, the image controller identifies one or more photodetector groups of interest corresponding to the locations of the one or more pixels of interest. The image controller can retrieve the pixel data of the remaining photodetectors (i.e., the remaining pixels) in those one or more photodetector groups of interest. The image controller refrains from retrieving pixel data from photodetectors not in the one or more photodetector groups of interest. The image controller generates one or more high-resolution regions of interest by, for each high-resolution region of interest, combining the identified pixel of interest retrieved during the first-access step and the remaining pixels in a photodetector group of interest corresponding to the identified pixel of interest and retrieved during the second-access step. The image controller may provide the high-resolution region of interest to another computing device, e.g., for object tracking (e.g., eye tracking, facial tracking, etc.). Object tracking entails determining one or more characteristics of an object, e.g., captured in the high-resolution region of interest. Example characteristics include position of the object, orientation of the object, movement of the object (translational and/or rotational), acceleration of the object (translational and/or rotational), depth of the object, dimensions of the object, occlusion of the object, other visible features of the object, etc. Object tracking may include, e.g., gaze estimation, eye tracking, face tracking, hand tracking, tracking of another body part, tracking of an object in a field of view of an imaging device, or some combination thereof. In some embodiments, eye tracking may be performed using a low-resolution image, and gaze estimation may be performed using the high-resolution image.

Some embodiments described herein focus on first read for an 'eye tracking' sparse image (subsampled image) covering full or large portion of field of view (FOV) and second read for 'gaze estimation' using higher resolution cropped image. Higher resolution may be used to reduce the gaze error, which can be important to provide high quality and smooth user interface (e.g., by reducing the gap between locations of what the user actually sees and what computing unit estimates to calculates what the user is seeing). Gaze estimation may be used to locate the direction and position of eye on the headset display and on the scene in real world. While the user is wearing the headset, eye-tracking followed by the gaze estimation may be always on. Therefore, low power operation is important especially as the battery capacity of the headset is limited. Some embodiments described herein may function as a low power imaging system by providing two-step readout (e.g., a first lower resolution readout covering large field of view (FOV) and a second higher resolution readout covering smaller FOV). The first readout can be used to quickly track interest object and the second readout can be used to extract accurate information, characteristic of the interest object.

This two-step readout can be applied not only for inward facing cameras such as eye-tracking-gaze-estimation system but also outward facing cameras such as hand-tracking-gesture-recognition system, but not limited to only those applications.

In the example of eye tracking, the imaging device may provide high-resolution regions of interest that describe the user's eyes but may omit other portions of the images captured by the image sensor (e.g., rest of face). As such, the imaging device is transferring only the regions of interest, thereby saving computing resources and computing time. In effect, the artificial reality system may perform eye tracking at a lower power consumption.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

FIG. 1A is a perspective view of a headset 100 implemented as an eyewear device, in accordance with one or more embodiments. In some embodiments, the eyewear device is a near eye display (NED). In general, the headset 100 may be worn on the face of a user such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes a frame, and may include, among other components, a display assembly including one or more display elements 120, a depth camera assembly (DCA), an audio system, and a position sensor 190. While FIG. 1A illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1A.

The frame 110 holds the other components of the headset 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, earpiece).

The one or more display elements 120 provide light to a user wearing the headset 100. As illustrated the headset includes a display element 120 for each eye of a user. In some embodiments, a display element 120 generates image light that is provided to an eyebox of the headset 100. The eyebox is a location in space that an eye of user occupies while wearing the headset 100. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 120 are at least partially transparent, such that light from the local area may be combined with light from the one or more display elements to produce AR and/or MR content.

In some embodiments, a display element 120 does not generate image light, and instead is a lens that transmits light from the local area to the eyebox. For example, one or both of the display elements 120 may be a lens without correction (non-prescription) or a prescription lens (e.g., single vision, bifocal and trifocal, or progressive) to help correct for defects in a user's eyesight. In some embodiments, the display element 120 may be polarized and/or tinted to protect the user's eyes from the sun.

In some embodiments, the display element 120 may include an additional optics block (not shown). The optics block may include one or more optical elements (e.g., lens, Fresnel lens, etc.) that direct light from the display element 120 to the eyebox. The optics block may, e.g., correct for aberrations in some or all of the image content, magnify some or all of the image, or some combination thereof.

The DCA determines depth information for a portion of a local area surrounding the headset 100. The DCA includes one or more imaging devices 130 and a DCA controller (not shown in FIG. 1A), and may also include an illuminator 140. In some embodiments, the illuminator 140 illuminates a portion of the local area with light. The light may be, e.g., structured light (e.g., dot pattern, bars, etc.) in the infrared (IR), IR flash for time-of-flight, etc. In some embodiments, the one or more imaging devices 130 capture images of the portion of the local area that include the light from the illuminator 140. As illustrated, FIG. 1A shows a single illuminator 140 and two imaging devices 130. In alternate embodiments, there is no illuminator 140 and at least two imaging devices 130.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 140), some other technique to determine depth of a scene, or some combination thereof.

The headset may further include an object-tracking unit that performs object tracking using images (or portions thereof) captured by an imaging device. The object-tracking unit determines one or more characteristics of an object present in an image (or portion thereof). Example characteristics include position of the object, orientation of the object, movement of the object (translational and/or rotational), acceleration of the object (translational and/or rotational), depth of the object, dimensions of the object, occlusion of the object, other visible features of the object, etc. Object tracking may include, e.g., gaze estimation, eye tracking, face tracking, hand tracking, tracking of another body part, tracking of an object in a field of view of an imaging device, or some combination thereof. In some embodiments, the object tracking unit may also include one or more illuminators that illuminate the object and/or the local area with an illumination pattern (e.g., structured light, glints, etc.). The object tracking unit may use the illumination pattern in the captured images to determine the one or more characteristics. The headset 100 may prompt the user to opt-in to allow operation of the object tracking unit as it pertains to tracking a body of the user or a portion thereof. For example, by opting in, the object tracking unit may detect, store, images of the user's eye or eye tracking information of the user. In some embodiments, the object-tracking unit is a component of the DCA. In further embodiments, the object-tracking unit may comprise one or more imaging devices 130.

The imaging device 130 generally captures images, e.g., of a local area, a user's face (or a portion thereof), other portions of a user's body. The imaging device 130 generally comprises an optics block that focuses external light onto an image sensor. The image sensor comprises a plurality of photodetectors (or other types of light sensors) that convert incident light into an electrical signal representing intensity of the incident light. A pixel represents the electrical signal captured by a photodetector in at least one electromagnetic channel. Pixel data may refer to one or more pixels from one or more photodetectors. As such, a pixel may further comprise additional electrical signals for additional electromagnetic channels (e.g., red, green, blue, infrared, other ranges of wavelengths of light, etc.). The imaging device 130 may further comprise an image controller that processes the electrical signals stored in the pixels to generate images, e.g., for the DCA to perform object tracking. To perform region of interest sampling and retrieval, the imaging device 130 captures an image on the image sensor. Then the imaging device 130 retrieves pixel data from a sample set of photodetectors (also referred to as "sample pixels") from the image sensor, yielding a low-resolution sample of the image. The imaging device 130 identifies one or more pixels of interest from the sample pixels and locations of the pixels of interest. For example, in eye-tracking applications, the imaging device 130 may identify a pixel corresponding to a pupil of the eye as the pixel of interest. The imaging device 130 retrieves the remaining pixels in the photodetector group of interest corresponding to the pixel of interest (or remaining pixels in the photodetector groups for multiple pixels of interest). The imaging device 130 combines the remaining pixels and the pixel of interest to generate a high-resolution region of interest. In the eye-tracking example, the high-resolution region of interest may encompass the whole eye of the user. The image controller may perform object tracking (e.g., gaze estimation) with the one or more high-resolution region of interests or may provide the one or more high-resolution region of interests to the DCA, e.g., for object tracking. Additional details relating to the region of interest sampling and retrieval is described below in conjunction with FIGS. 2-6.

The audio system provides audio content. The audio system includes a transducer array, a sensor array, and an audio controller 150. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The transducer array presents sound to user. The transducer array includes a plurality of transducers. A transducer may be a speaker 160 or a tissue transducer 170 (e.g., a bone conduction transducer or a cartilage conduction transducer). Although the speakers 160 are shown exterior to the frame 110, the speakers 160 may be enclosed in the frame 110. In some embodiments, instead of individual speakers for each ear, the headset 100 includes a speaker array comprising multiple speakers integrated into the frame 110 to improve directionality of presented audio content. The tissue transducer 170 couples to the head of the user and directly vibrates tissue (e.g., bone or cartilage) of the user to generate sound. The number and/or locations of transducers may be different from what is shown in FIG. 1A.

The sensor array detects sounds within the local area of the headset 100. The sensor array includes a plurality of acoustic sensors 180. An acoustic sensor 180 captures sounds emitted from one or more sound sources in the local area (e.g., a room). Each acoustic sensor is configured to detect sound and convert the detected sound into an electronic format (analog or digital). The acoustic sensors 180 may be acoustic wave sensors, microphones, sound transducers, or similar sensors that are suitable for detecting sounds.

In some embodiments, one or more acoustic sensors 180 may be placed in an ear canal of each ear (e.g., acting as binaural microphones). In some embodiments, the acoustic sensors 180 may be placed on an exterior surface of the headset 100, placed on an interior surface of the headset 100, separate from the headset 100 (e.g., part of some other device), or some combination thereof. The number and/or locations of acoustic sensors 180 may be different from what is shown in FIG. 1A. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 100.

The audio controller 150 processes information from the sensor array that describes sounds detected by the sensor array. The audio controller 150 may comprise a processor and a computer-readable storage medium. The audio controller 150 may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 160, or some combination thereof.

The position sensor 190 generates one or more measurement signals in response to motion of the headset 100. The position sensor 190 may be located on a portion of the frame 110 of the headset 100. The position sensor 190 may include an inertial measurement unit (IMU). Examples of position sensor 190 include: one or more accelerometers, one or more gyroscopes, one or more magnetometers, another suitable type of sensor that detects motion, a type of sensor used for error correction of the IMU, or some combination thereof. The position sensor 190 may be located external to the IMU, internal to the IMU, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more RGB cameras that capture images of some or all of the local area. In some embodiments, some or all of the imaging devices 130 of the DCA may also function as the PCA. The images captured by the PCA and the depth information determined by the DCA may be used to determine parameters of the local area, generate a model of the local area, update a model of the local area, or some combination thereof. Furthermore, the position sensor 190 tracks the position (e.g., location and pose) of the headset 100 within the room. Additional details regarding the components of the headset 100 are discussed below in connection with FIG. 7.

Figure 1B:
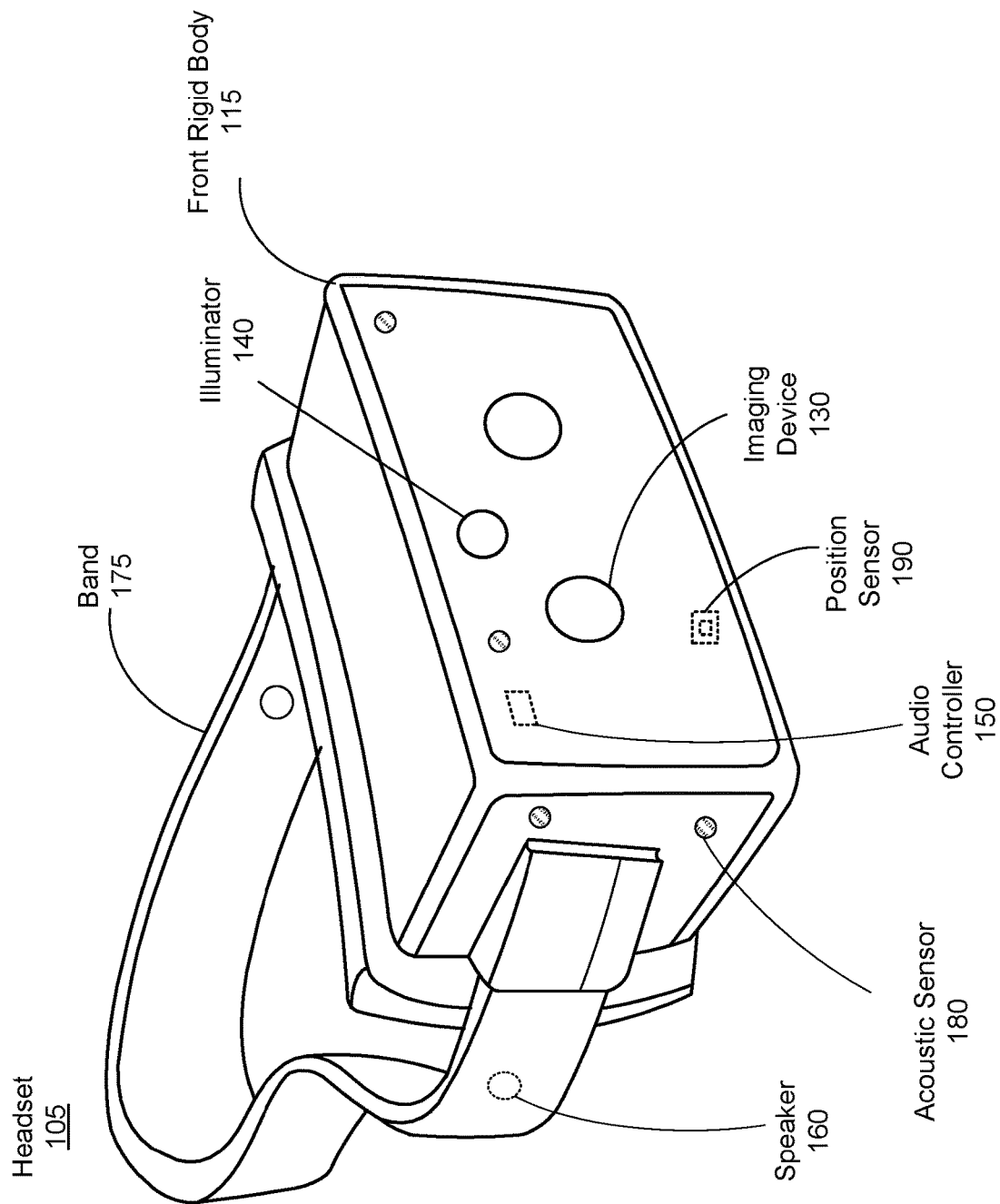
FIG. 1B is a perspective view of a headset implemented as a head-mounted display, in accordance with one or more embodiments.

FIG. 1B is a perspective view of a headset 105 implemented as a HMD, in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 115 and a band 175. The headset 105 includes many of the same components described above with reference to FIG. 1A, but modified to integrate with the HMD form factor. For example, the HMD includes a display assembly, a DCA, an audio system, and a position sensor 190. FIG. 1B shows the illuminator 140, a plurality of the speakers 160, a plurality of the imaging devices 130, a plurality of acoustic sensors 180, and the position sensor 190. The speakers 160 may be located in various locations, such as coupled to the band 175 (as shown), coupled to front rigid body 115, or may be configured to be inserted within the ear canal of a user.

Imaging Device

Figure 2:
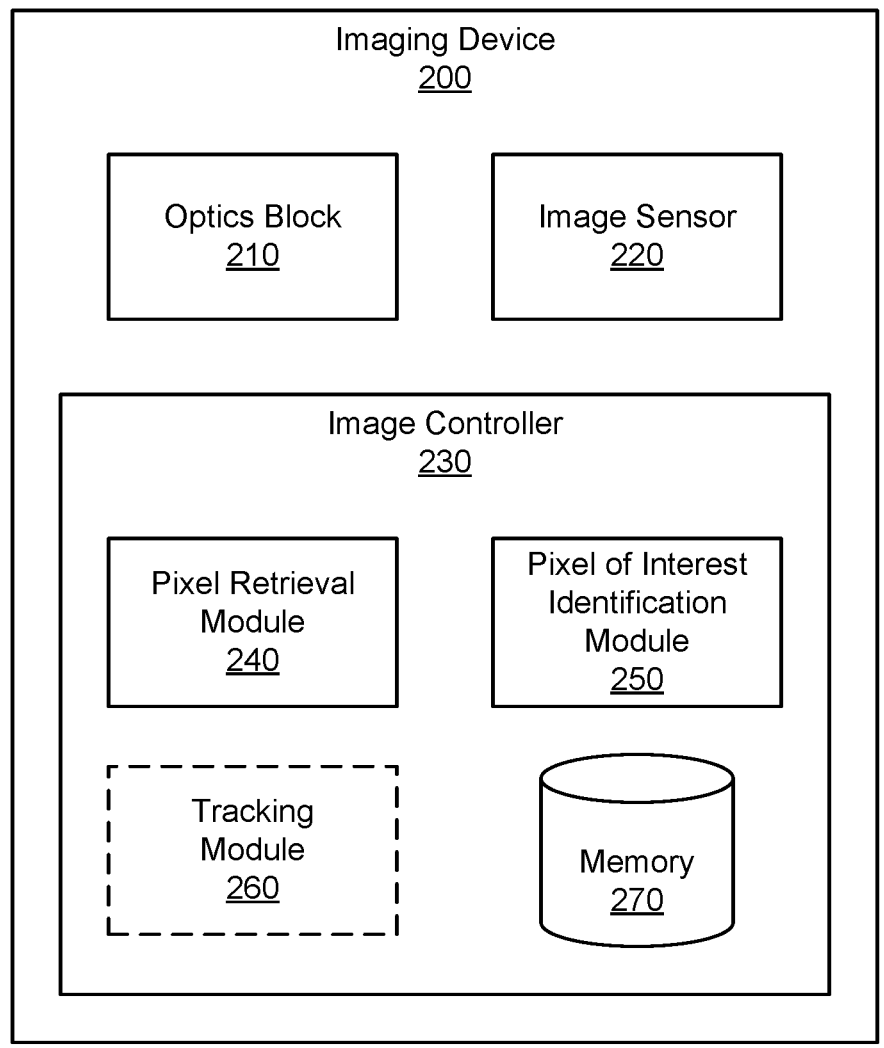
FIG. 2 is a block diagram of an imaging device, in accordance with one or more embodiments.

FIG. 2 is a block diagram of an imaging device 200, in accordance with one or more embodiments. The imaging device 200 captures images and performs region of interest sampling and retrieval yielding one or more high-resolution regions of interest, e.g., for object tracking by a DCA. The imaging device 130 is an embodiment of the imaging device 200. The imaging device 200 comprises an optics block 210, an image sensor 220, and an image controller 230. In other embodiments, the imaging device 200 may comprise additional components, different components, or fewer components than those listed herein.

The optics block 210 directs external light onto the image sensor 220. The optics block 210 may magnify the external light, may filter the external light, may warp the external light, or may otherwise optically modify the external light prior to incidence onto the image sensor. In various embodiments, the optics block 210 includes one or more optical elements. Example optical elements included in the optics block 210 include: an aperture, a Fresnel lens, a convex lens, a concave lens, a filter, a reflecting surface, or any other suitable optical element that affects light. Moreover, the optics block 210 may include combinations of different optical elements. In some embodiments, one or more of the optical elements in the optics block 210 may have one or more coatings, such as partially reflective or anti-reflective coatings.

The image sensor 220 converts light incident on the image sensor 220 into electrical signals. The image sensor 220 may comprise a plurality of photodetectors that each convert light incident on that photodetector into an electrical signal representing an intensity of the incident light. A photodetector as any device that can detect electromagnetic radiation in a visible and/or IR band. A photodetector may be coupled to one or more charge storage bins that can store electric charge. Each photodetector is coupled to at least one charge storage bin that can store an electrical signal corresponding to incident light on the photodetector. Each photodetector may further be coupled to at least one reset charge storage bin that stores a reset signal, which is used in resetting of the other charge storage bins, i.e., to clear a charge storage bin of a stored electrical signal. The photodetector may multiplex storage of electrical charge such that an electrical signal stored in a first charge storage bin corresponds to incident light during a first period of time and an electrical signal stored in a second charge storage bin corresponds to incident light during a second period of time that is offset from the first period of time. To accomplish such multiplexing, the photodetector may open a transfer gate directing electric charge from the photodetector to the first charge storage bin during the first period of time, while keeping the other transfer gates closed. After the first period of time, the photodetector may close the transfer gate directing electric charge to the first storage bin. During the second period of time, the photodetector may open another transfer gate directing electric charge from the photodetector to the second charge storage bin, while keeping other transfer gates closed. The photodetector may operate in a similar manner in embodiments with additional charge storage bins. In other embodiments, the photodetector may concurrently open transfer gates directing electric charge to two or more charge storage bins, resulting in the two or more charge storage bins storing substantially the same electrical signal.

A pixel refers to the one or more electrical signals captured by a photodetector in one or more light channels (e.g., red, green, blue, infrared, other ranges of wavelengths of light, etc.). For example, a single pixel may correspond to an electrical signal for a single photodetector that captures light in the infrared. And in some embodiments, a single pixel may be composed of sub-pixels which each correspond to respective electrical signals for different color channels (e.g., Red, Green, Blue) of the pixel. Pixel data may refer to one or more pixels, e.g., captured by one or more photodetectors.

The photodetectors may be subdivided into photodetector groups. The photodetector groups may be uniform in size or may vary. As an example of uniform photodetector groups, each photodetector group may be the same dimensions, e.g., same number of rows of photodetectors and same number of columns of photodetectors. As an example of varying photodetector groups, a first photodetector group may comprise more photodetectors than a second photodetector group. Additional detail relating to a layout of the image sensor 220 is described in conjunction with FIG. 3.

The image controller 230 accesses the electrical signals stored by the image sensor 220 to generate the high-resolution region of interest. The image controller 230 may be a computer processing unit configured to process the electrical signals accessed from the image sensor 220. The image controller 230 may comprise a pixel retrieval module 240, a pixel of interest identification module 250, a tracking module (which may be optional), and a memory 270. In other embodiments, the image controller 230 may be disposed on another computing device, e.g., as a component of a DCA. In other embodiments, the image controller 230 may comprise additional components, different components, or fewer components than those illustrated herein. For example, the image controller 230 may comprise additional modules for processing and analyzing the high-resolution region of interest generated by the image controller 230.

The pixel retrieval module 240 manipulates pixel data. Manipulation of pixel data may entail retrieval of pixel data from the image sensor, storing of pixel data in one or more memories, clearing a memory of pixel data, other actions with pixel data, etc. The pixel retrieval module 240 accesses pixel data from the image sensor 220, i.e., the pixel retrieval module 240 transfers the electrical signal stored by a photodetector on the image sensor to the memory 270 as a pixel. The pixel retrieval module 240 can further transfer the pixel data throughout the memory 270.

According to region of interest sampling and retrieval, the pixel retrieval module 240 retrieves pixel data from sample photodetectors on the image sensor 220 and stores the pixel data of the sample photodetectors (may also be referred to as "sample pixels") on the memory 270. Based on any identified pixels of interest and the locations thereof (e.g., identified by the pixel of interest identification module 250), the pixel retrieval module 240 retrieves additional pixel data from the image sensor, specifically from photodetector groups corresponding to the identified pixels of interest. When retrieving the pixel data from photodetector group(s) of interest, the pixel retrieval module 240 may refrain from reading out pixel data from photodetectors not part of any photodetector group of interest. The pixel retrieval module 240 generates a high-resolution region of interest with the pixel data read out from the first-access step, the second-access step, or some combination thereof.

In one or more embodiments, the pixel retrieval module 240 may retrieve pixel data from all photodetectors in the photodetector groups of interest. Retrieving pixels from all photodetectors in the photodetector group(s) of interest entails re-accessing the sample photodetectors in the photodetector group(s) of interest. In some embodiments, each photodetector is coupled to at least one charge storage bin storing the electrical signal. The pixel retrieval module 240 may read out the electrical signal twice, first during the first-access step and second during the second-access step. The second-access pixel of the charge storage bin of the sample photodetector may have a low level of noise, of sufficient fidelity to perform subsequent actions. When reading out pixel data from all photodetectors in photodetector group(s) of interest, the pixel retrieval module 240 forms the high-resolution region(s) of interest from the pixel data read out during the second-access step.

In other embodiments, the pixel retrieval module 240 may retrieve pixel data from the remaining photodetectors (may also be referred to as "remaining pixels") in the photodetector group(s) corresponding to the identified pixel(s) of interest. The pixel retrieval module 240 may also temporarily store the pixel data of the identified pixels of interest in separate memory (i.e., retrieved during the first-access step). The pixel retrieval module 240 also generates a high-resolution region of interest by combining a pixel of interest and the remaining pixels in a photodetector group corresponding to the pixel of interest.

In yet other embodiments, the pixel retrieval module 240 may retrieve pixel data from a subset of photodetectors in the photodetector group(s) of interest. In such embodiments, the pixel retrieval module 240 may retrieve pixel data from some but not all of the photodetectors in the photodetector group(s) of interest. This pixel data is a denser sampling compared to a single sample pixel for the whole photodetector group, but is smaller than the full resolution of the image sensor. The generated high-resolution region of interest is both higher in resolution than the low-resolution image formed by the sample pixels and lower in resolution than the full-resolution image captured by the image sensor 220.

In one or more embodiments, the pixel retrieval module 240 may retrieve pixel data from multiple photodetector groups of interest. In some embodiments, the pixel retrieval module 240 generates one high-resolution region of interest from pixel data of multiple photodetector groups of interest. The multiple photodetector groups of interest may be adjacent. In cases where the multiple photodetector groups of interest are not adjacent, the pixel retrieval module 240 may read out pixel data from other photodetector groups to form a contiguous high-resolution region of interest with the pixel data from the photodetector groups of interest. In other embodiments, the pixel retrieval module 240 generates multiple high-resolution regions of interest from the pixel data of the multiple photodetector groups of interest. The pixel retrieval module 240 may read out the pixel data from the multiple photodetector groups of interest concurrently during the second-access step to the memory 270, then generate the multiple high-resolution regions of interest. Alternatively, the pixel retrieval module 240 may read out the pixel data from the multiple photodetector groups of interest sequentially. For example, pixel data from a first photodetector group of interest is read out to the memory 270 and used to generate a first high-resolution region of interest, then pixel data from a second photodetector group of interest is read out to the memory 270 and used to generate a second high-resolution region of interest.

The pixel of interest identification module 250 identifies one or more pixels of interest from sampled pixels. The pixel of interest identification module 250 also identifies locations of the pixels of interest relative to the sample pixels. For example, the pixel retrieval module 240 reads out a set of sample pixels from a plurality of sample photodetectors of a plurality of photodetector groups. As each photodetector group may have one sample photodetector, the location of a given photodetector group relative to other photodetector groups equates to the location of the given photodetector group's sample pixel relative to other sample pixels. For example, the image sensor 220 may be subdivided into 150 photodetector groups, arranged in 10 rows by 15 columns. The sample pixels retrieved from this image sensor 220 would comprise 150 total sample pixels, arranged in 10 rows by 15 columns. As such, sample pixel with a location represented by coordinates <4, 8> (relative to other sample pixels in the 10×15 grid) was retrieved from the photodetector group at the same coordinates <4, 8> (relative to other photodetector groups in the image sensor).

In one or more embodiments, the pixel of interest identification module 250 identifies the pixels of interest according to one or more selection criteria. Selection criteria may include, e.g., a pixel intensity threshold, a color (or color range), relating neighboring sample pixels, contrast between adjacent sample pixels, other selection criterion that can identify a sample pixel as relating to an object of interest, or some combination thereof. In one embodiment of a selection criterion, the pixel of interest identification module 250 may identify a pixel of interest that is above or below a threshold intensity. For example, the pixel of interest identification module 250 identifies a sample pixel above the pixel intensity threshold of an object that reflects an illumination pattern. In another embodiment, another selection criterion searches for pixel data that is in a particular color spectrum (e.g., to identify skin tone pertaining to a user's face). In a third example, the pixel of interest identification module 250 may identify a first sample photodetector as a pixel of interest (e.g., based on other selection criteria) and then identify the neighboring pixels as also pixels of interest. For example, to identify a pupil, the pixel of interest identification module 250 may search for a dark sample pixel (e.g., pertaining to the pupil) surrounded by brighter sample pixels (e.g., pertaining to sclera or skin tone). The pixel of interest identification module 250 may further implement one or more filters to detect one or more features in the low-resolution image formed by the sample pixels. The filters may detect particular shapes (e.g., round shape), contrast between adjacent pixels (e.g., left and right contrast, up and down contrast, or diagonal contrast), size of a dark area, size of a bright area, identification of other spatial features, or some combination thereof.

In other embodiments, the pixel of interest identification module 250 may apply a pattern recognition model to identify the pixel of interest. The pattern recognition model may be trained to identify the pixels of interest from the sampled set of pixels. For example, the pattern recognition model may be a machine-learned model that is trained on labeled image data, wherein each training image's region of interest is labeled. For example, the region of interest is labeled which encompasses the object of interest (e.g., eyes, face, hands, another portion of the user's body, etc.). In the particular implementation of eye tracking, the pattern recognition model may be trained with image data of human faces with the human eyes labeled as regions of interest. The training image data may further be of the same resolution as the sampled set of pixels, sampled by the pixel retrieval module 240 from the image sensor 220.

In some embodiments, the pixel of interest identification module 250 may utilize a memory cache in the memory 270 to track prior pixels of interest and their locations. This may provide insight into updated locations of the pixels of interest. For example, in eye tracking, the pixel of interest identification module 250 may determine that the past five images had pixels of interest corresponding to the user's pupil identified around the middle in the images. This may inform the pixel of interest identification module 250 to reject pixels of interest identified around the periphery of the image.

In additional embodiments, the image controller 230 may comprise a tracking module 260 configured to track one or more objects in the high-resolution regions of interest (e.g., generated by the pixel retrieval module). The tracking module 260 may receive a high-resolution region of interest and may determine one or more characteristics (e.g., gaze estimation) of an object captured in the high-resolution region of interest. Depending on the object, the tracking module 260 may determine varying characteristics from the high-resolution region of interest. Example characteristics include position of the object, orientation of the object, movement of the object (translational and/or rotational), acceleration of the object (translational and/or rotational), depth of the object, dimensions of the object, occlusion of the object, other visible features of the object, etc. For an eye-tracking example, the tracking module 260 may determine position of a user's eye, orientation of the user's eye, gaze of the user's eye (gaze estimation), vergence of the user's eyes, pupil dilation of the user's eye, movement of the user's eye, other characteristics relating to the user's eyes, or some combination thereof. In an example with tracking a user's hands, the tracking module 260 may classify between a plurality of hand poses (e.g., open hand, 1-finger up, 2-fingers up, 3-fingers up, 4-fingers up, 5-fingers up, closed fist, palm up, palm down, palm sideways, etc.). In an example with tracking rigid objects, the tracking module 260 may track a light source present in the field of view of the imaging device (e.g., to keep a headset implementing the imaging device in a certain orientation).

The memory 270 stores pixel data in use by the image controller 230. The memory 270 comprises main memory for use by the image controller 230. The main memory can hold pixel data retrieved from the image sensor 220 prior to provision of the high-resolution region of interest to other computing devices (e.g., the DCA). The memory 270 may further comprise temporary memory, long-term memory, a memory cache, other types of memory, or some combination thereof. The temporary memory may hold pixel data temporarily, i.e., on a short-term basis. The long-term memory may hold larger quantities of pixel data for long periods of time for access and retrieval in subsequent sessions of operation. In memory cache may also hold larger quantities of pixel data during a session of the imaging device 200. At the end of the session, the memory cache may be cleared.

Figure 3:
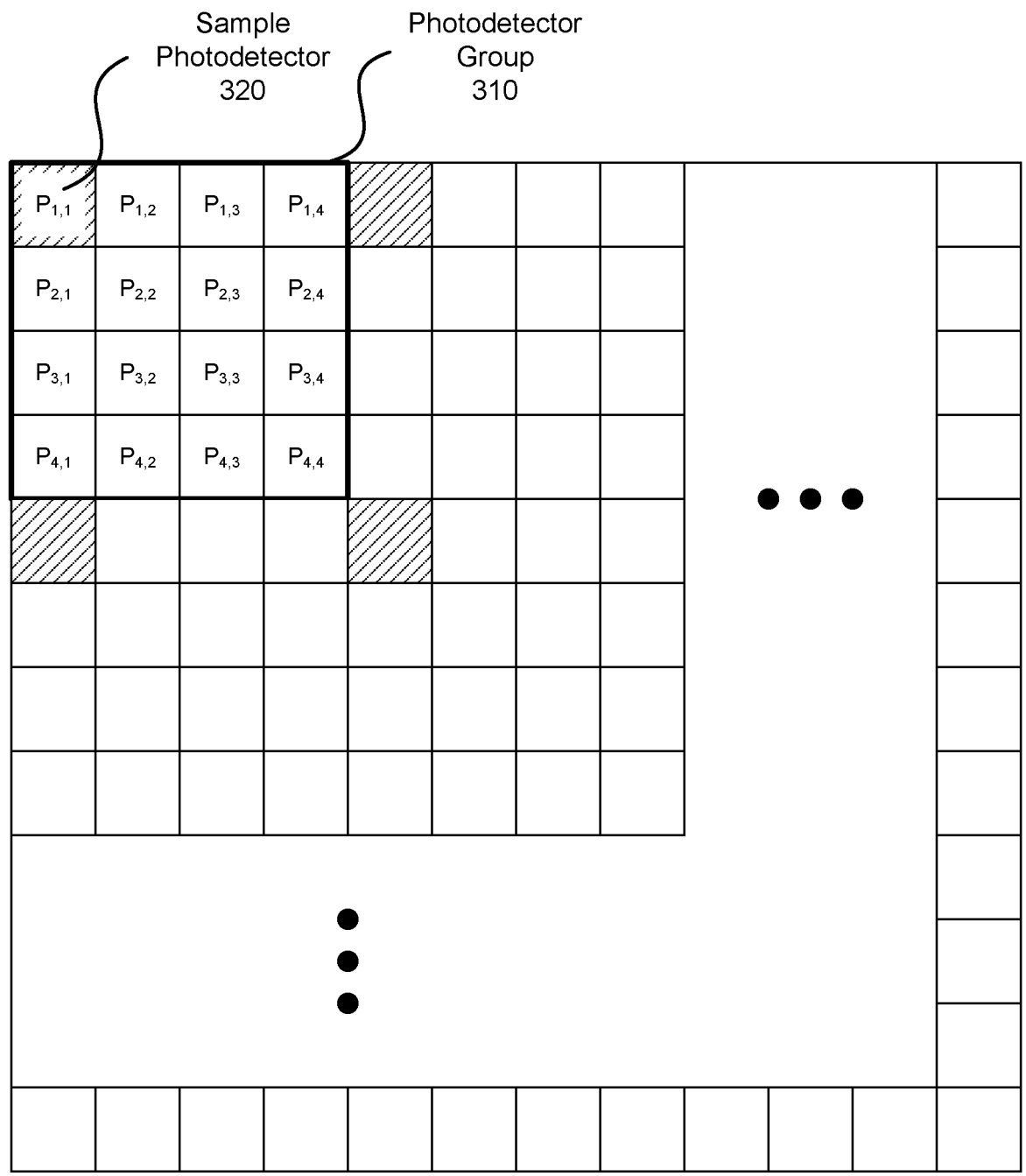
FIG. 3 illustrates an image sensor comprising photodetector groupings, in accordance with one or more embodiments.

FIG. 3 illustrates an image sensor 300 comprising photodetector groupings, in accordance with one or more embodiments. The image sensor 300 may be an embodiment of the image sensor 220. In the embodiment of FIG. 3, the image sensor 300 comprises a plurality of photodetector groups. Each photodetector group may also have coordinates. For example, if there are 10×15 photodetector groups, totaling 150 photodetector groups, the coordinates for the photodetector groups range as whole numbers from [1, 10] for rows and [1, 15] for columns.

A first photodetector group 310 is shown including sixteen total photodetectors in a 4×4 grid. Each photodetector group may have a designated sample photodetector. For example, the first photodetector group 310 has sample photodetector 320 that is in $P_{1,1}$ position in the photodetector group, i.e., the first row and the first column of the grid. In other embodiments, the sample photodetector may be in a different position from one photodetector group to another. In some embodiment, the photodetector groups are of uniform dimensions (same number of rows and same number of columns). In other embodiments, the groups may have varying dimensions. For example, a first photodetector group comprises more photodetectors and is larger in dimensions than a second photodetector group. In such embodiments, photodetector groups of a larger size would effectually produce sparser sampling (e.g., for less-likely portions of the image sensor to contain a region of interest), while photodetector groups of a smaller size would effect denser sampling (e.g., for more-likely portions of the image sensor to contain a region of interest).

In these embodiments, the image sensor 300 may dispose sparser-sampling photodetector groups in portions of the image sensor that are less likely to contain the object of interest while disposing photodetector groups in portions of the image sensor that are more likely to contain the object of interest. For example, the image sensor 300, in capturing images of a user's face for eye tracking, may dispose sparser-sampling photodetector groups around a periphery of the image sensor 300 while disposing denser-sampling photodetector groups around an interior of the image sensor 300.

During the first-access step of region of interest sampling and retrieval, the image controller 230 retrieves the pixel data of the sample photodetector in each photodetector group. Upon identifying the pixel of interest, the image controller 230 retrieves the pixel data of the remaining pixels in the photodetector group of interest during a second-access step. The image controller 230 refrains from reading out any other pixels not in the photodetector group of interest during the second-access step.

As an example with the first photodetector group 310, the sample pixel of sample photodetector 320 is retrieved in the first-access step along with other sample pixels. If the sample pixel corresponding to the sample photodetector 320 is determined to be a pixel of interest, the image controller 230 may also identify the location of the sample pixel with coordinates <1, 1> (relative to other sample pixels), which corresponds to the first photodetector group 310 with coordinates <1, 1> (relative to other photodetector groups). In other words, the location of the sample pixel may be described by coordinates in a grid of the sample pixels. If there are 10×15 sample pixels read out, corresponding to 10×15 photodetector groups, then the coordinates <x, y> are such that x ranges from 1 to 10 (i.e., [1, 10]) and y ranges from 1 to 15 (i.e., [1, 15]). The photodetector groups may be arranged similarly to the sample pixels. For example, 10×15 sample pixels are read out from 10×15 photodetector groups. As such, the location of a photodetector group relative to other photodetector groups may also be represented by coordinates in a grid of the photodetector groups. During the second-access step, the image controller 230 retrieves pixel data from the remaining photodetectors in the first photodetector group 310, in particular photodetectors $P_{1,2}$, $P_{1,3}$, $P_{1,4}$, $P_{2,1}$, $P_{2,2}$, $P_{2,3}$, $P_{2,4}$, $P_{3,1}$, $P_{3,2}$, $P_{3,3}$, $P_{3,4}$, $P_{4,1}$, $P_{4,2}$, $P_{4,3}$, and $P_{4,4}$. And as the pixel data for the sample photodetector 320 was previously retrieved, the image controller 230 may refrain from re-retrieving pixel data from the sample photodetector 320, i.e., $P_{1,1}$, as multiple accesses of the same photodetector can lead to noisy pixel data.

Region of Interest Sampling and Retrieval

FIGS. 4A-4D, FIGS. 5A-5D, and FIGS. 6A-6E illustrate different implementations of region of interest sampling and retrieval, in accordance with one or more embodiments. In particular, FIGS. 4A-4D illustrate a first implementation where a pixel of interest is re-accessed during the second-access step. FIGS. 5A-5D & FIGS. 6A-6E illustrate different manners of storing an identified pixel of interest prior to a second-access step of retrieving remaining pixels. The process shown in FIGS. 4A-4D, FIGS. 5A-5D, and FIGS. 6A-6E may be performed by components of an imaging device (e.g., the imaging device 200). Other entities may, in other embodiments, perform some or all of the steps in FIGS. 4A-4D, FIGS. 5A-5D, and FIGS. 6A-6E.

FIGS. 4A-4D illustrate a first implementation of region of interest sampling and retrieval, in accordance with one or more embodiments. In this first implementation, an imaging controller (e.g., the image controller 230) re-accesses a sample photodetector in an identified photodetector group of interest.

Figure 4A:
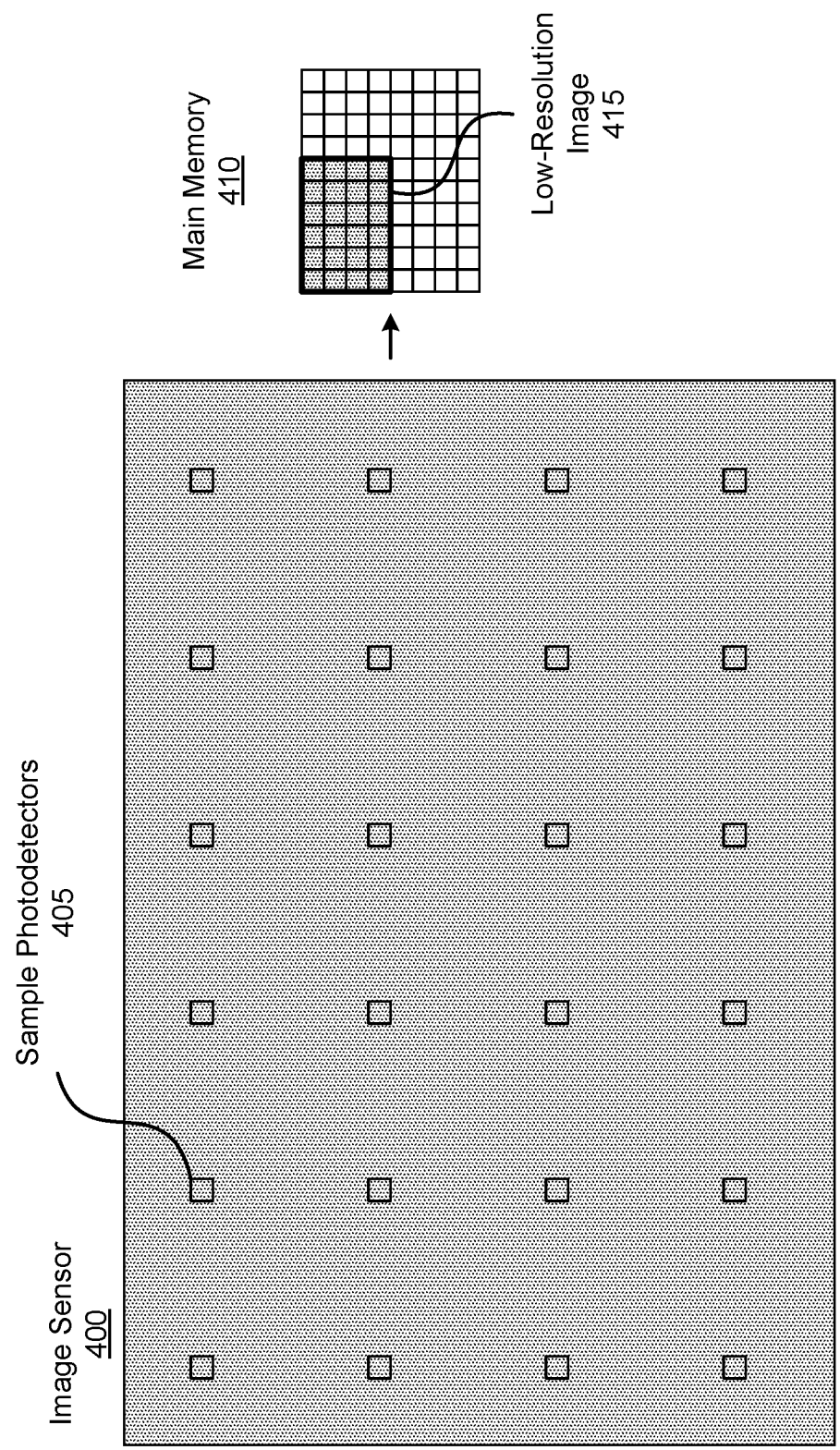
FIG. 4A illustrates a first implementation of region of interest sampling and retrieval, in particular sampling of photodetector groups, in accordance with one or more embodiments.

FIG. 4A illustrates the first implementation of region of interest sampling and retrieval, in particular sampling of photodetector groups, in accordance with one or more embodiments. In FIG. 4A, the image sensor 400 comprises 4×6 photodetector groups, wherein each photodetector group (not shown for simplicity) comprises 8×8 photodetectors. In total, the image sensor 400 comprises 32×48 photodetectors or 1,536 photodetectors. In other embodiments (not illustrated), the image sensor 400 may comprise a different number of photodetector groups, differently sized photodetector groups, different number of photodetectors, different dimensions, or some combination thereof. In a first-access step, the image controller retrieves sample pixels, i.e., pixel data for the sample photodetectors 405 (pointing to a representative sample photodetector in the image sensor 400) in the photodetector groups, and stores the sample pixels in a main memory 410 (e.g., as part of the memory 270 of FIG. 2), forming a low-resolution image 415. The main memory 410 may be sized accordingly to store the set of sample pixels retrieved during the first-access step and pixel data of at least one photodetector group. In other embodiments, the main memory 410 may be sized differently.

Figure 4B:
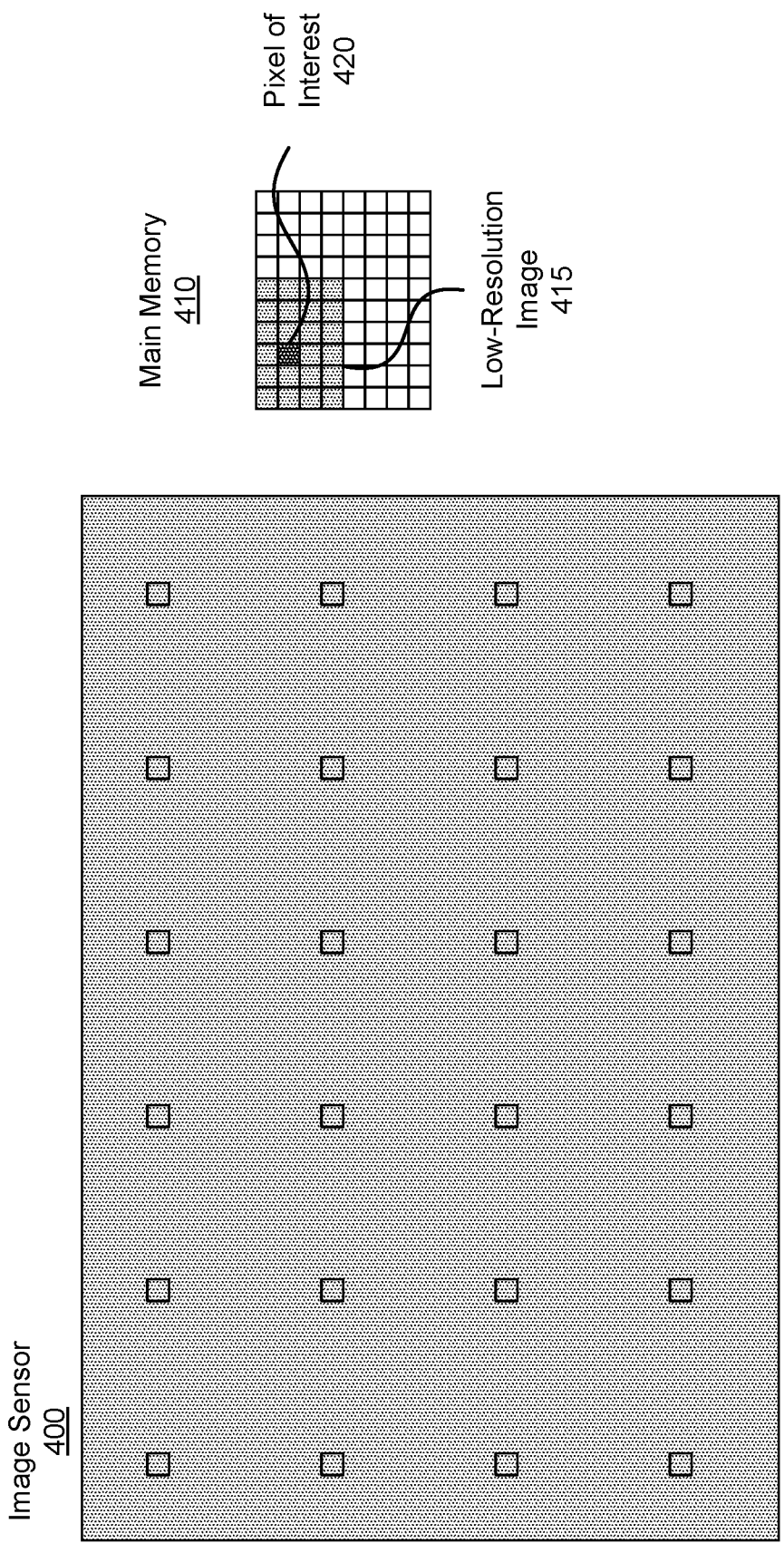
FIG. 4B illustrates the first implementation of region of interest sampling and retrieval, in particular identifying a pixel of interest, in accordance with one or more embodiments.

FIG. 4B illustrates the first implementation of region of interest sampling and retrieval, in particular identifying a pixel of interest 420, in accordance with one or more embodiments. The image controller identifies the pixel of interest 420, in the low-resolution image 415, with the coordinates of <2, 3>, i.e., $2^{nd}$ row and $3^{rd}$ column. The image controller may identify the pixel of interest according to methodology described above in conjunction with the pixel of interest identification module 250 of FIG. 2.

Figure 4C:
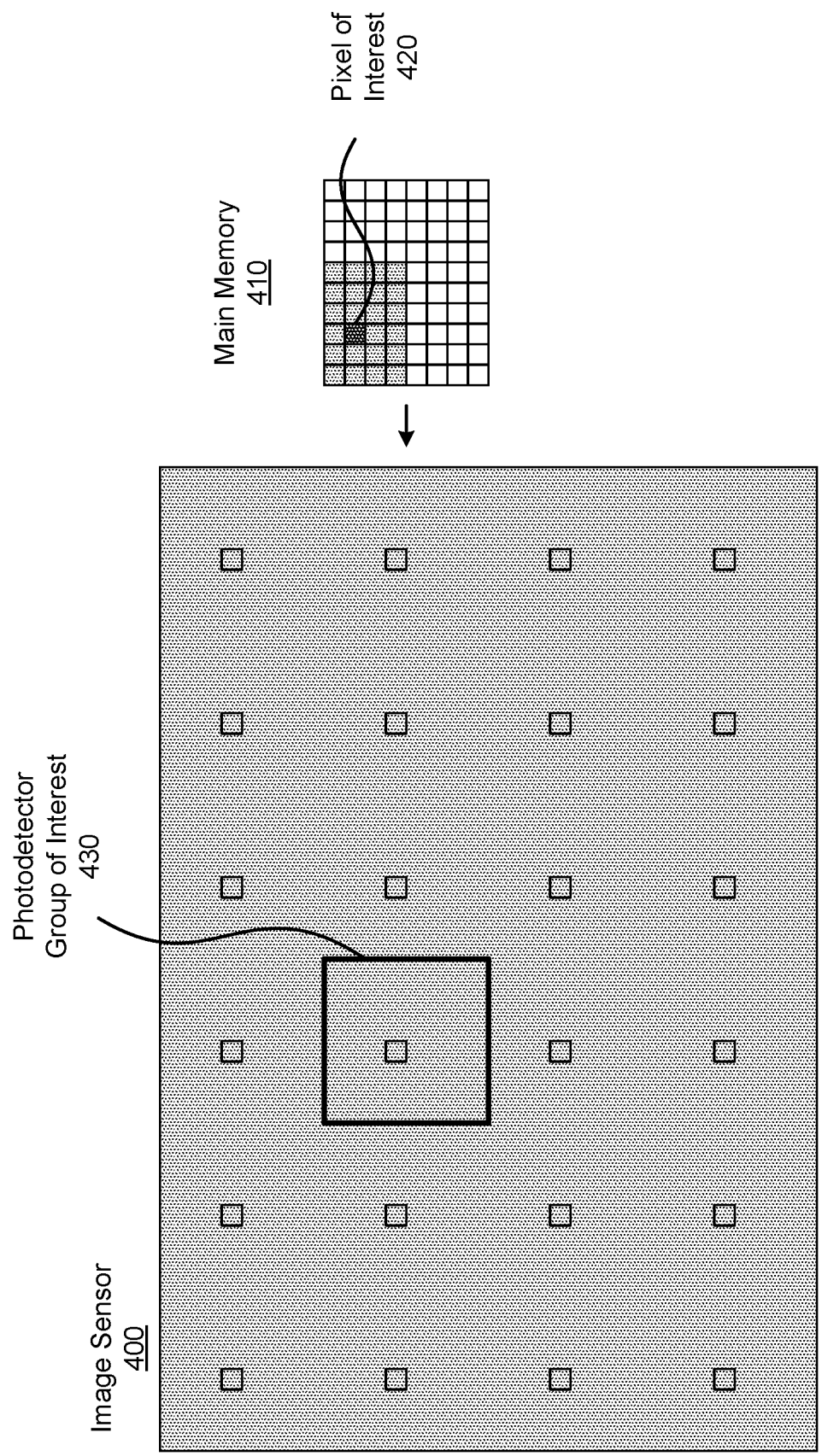
FIG. 4C illustrates the first implementation of region of interest sampling and retrieval, in particular identifying a photodetector group of interest, in accordance with one or more embodiments.

FIG. 4C illustrates the first implementation of region of interest sampling and retrieval, in particular identifying the photodetector group of interest, in accordance with one or more embodiments. The image controller identifies the photodetector group of interest 430 which corresponds to the location of the identified pixel of interest 420. In other words, the location of the pixel of interest 420 has coordinates <2, 3> relative to the other sample pixels which corresponds (or matches to) the photodetector group of interest 430 with coordinates <2, 3> relative to other photodetector groups. The image controller may clear the main memory 410, e.g., prior to the second-access step.

Figure 4D:
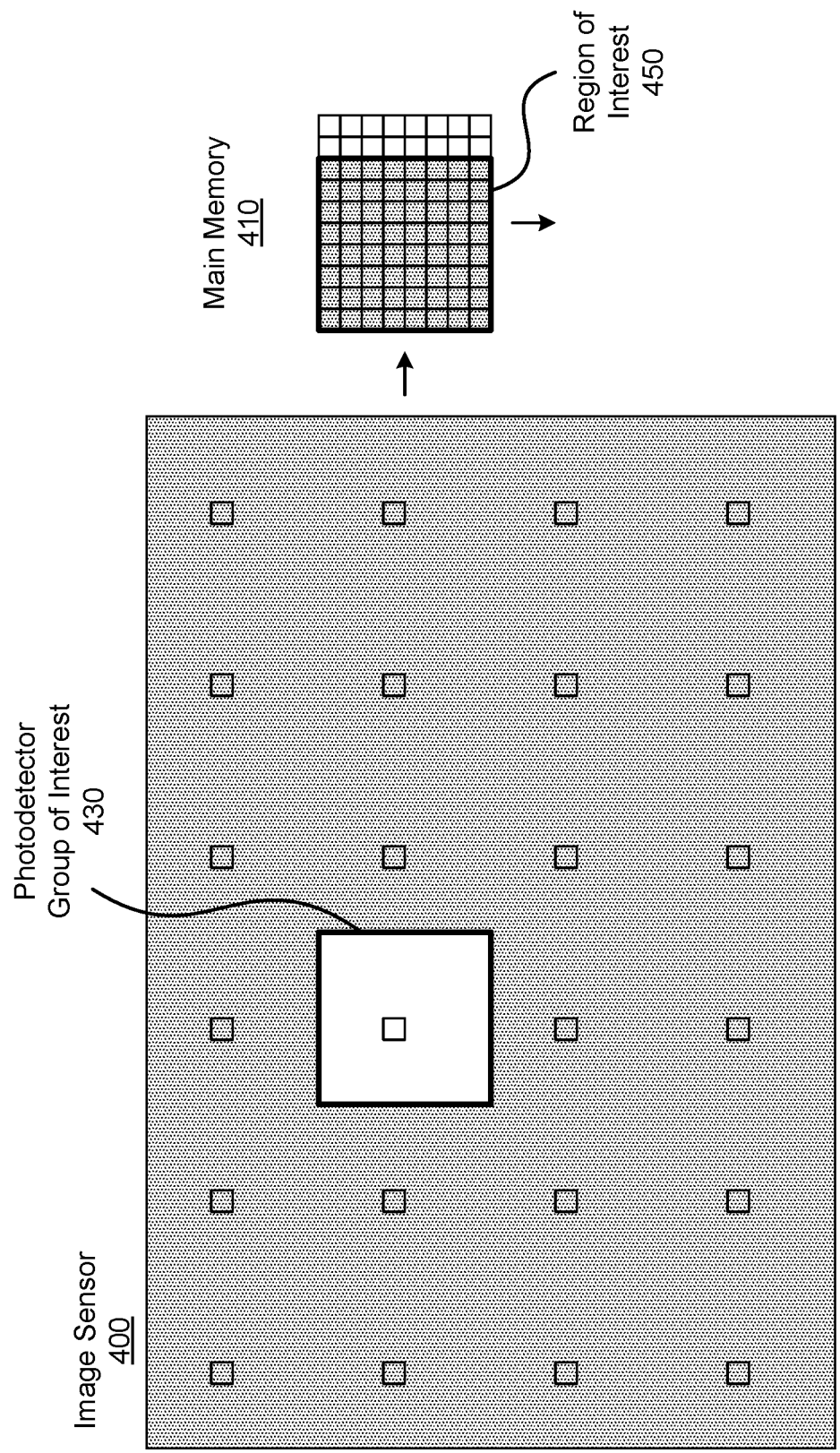
FIG. 4D illustrates the first implementation of region of interest sampling and retrieval, in particular accessing remaining pixels in a photodetector group of interest, in accordance with one or more embodiments.

FIG. 4D illustrates the first implementation of region of interest sampling and retrieval, in particular accessing remaining pixels in a photodetector group of interest 430, in accordance with one or more embodiments. During the second-access step, the image controller retrieves all pixels in the photodetector group of interest 430 to the main memory 410. In this first implementation, the image controller may re-access the sample photodetector in the photodetector group of interest 430. In embodiments wherein the photodetector comprises at least one charge storage bin storing the electrical signal, the image controller can re-access the same charge storage bin as in the first-access step to read out the pixel. The image controller may use the second-access pixel from re-accessing the sample photodetector if the second-access pixel is not too noisy. In embodiments wherein the photodetector comprises two or more charge storage bins storing separate electrical signals, the image controller may read out a first charge storage bin during the first-access step and may, subsequently, read out a second charge storage bin during the second-access step, e.g., to ensure the pixel read out from the sample photodetector during the second-access step is noise-free. In effect, the image controller has read out a high-resolution region of interest 450 from the image sensor 400 (i.e., without needing to temporarily store the pixel of interest 420).

FIGS. 5A-5D illustrate a second implementation of region of interest sampling and retrieval, in accordance with one or more embodiments. In this second implementation, an imaging controller (e.g., the image controller 230) transfers a pixel of interest to a corresponding position in the main memory of the image controller prior to retrieving the pixel data comprising the remaining pixels in a photodetector group of interest.

FIG. 5A illustrates a second implementation of region of interest sampling and retrieval, in particular sampling of photodetector groups, in accordance with one or more embodiments. In FIG. 5A, the image sensor 500 comprises 4×6 photodetector groups, wherein each photodetector group (not shown for simplicity) comprises 8×8 photodetectors. In total, the image sensor 500 comprises 32×48 photodetectors or 1,536 photodetectors. In other embodiments (not illustrated), the image sensor 500 may comprise a different number of photodetector groups, differently sized photodetector groups, different number of photodetectors, different dimensions, or some combination thereof. In a first-access step, the image controller retrieves sample pixels, i.e., pixel data for the sample photodetectors 505 (pointing to a representative sample photodetector in the image sensor 500) in the photodetector groups, and stores the sample pixels in a main memory 510 (e.g., as part of the memory 270 of FIG. 2), forming a low-resolution image 515. The main memory 510 may be sized accordingly to store the set of sample pixels retrieved during the first-access step and pixel data of at least one photodetector group. In other embodiments, the main memory 510 may be sized differently.

Figure 5B:
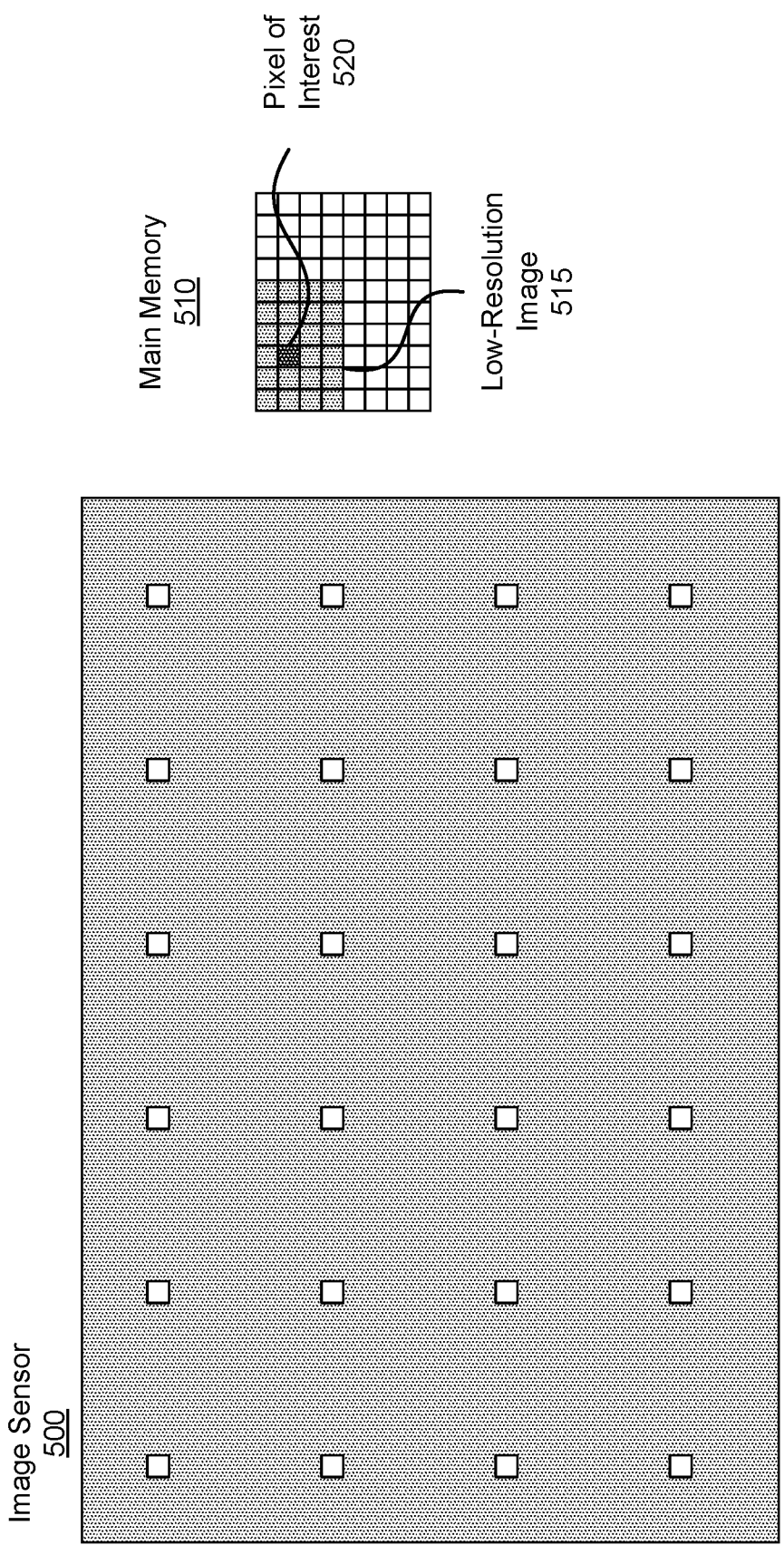
FIG. 5B illustrates the second implementation of region of interest sampling and retrieval, in particular identifying a pixel of interest, in accordance with one or more embodiments.

FIG. 5B illustrates the second implementation of region of interest sampling and retrieval, in particular identifying a pixel of interest 520, in accordance with one or more embodiments. The image controller identifies the pixel of interest 520, in the low-resolution image 515, with the coordinates of <2, 3>, i.e., $2^{nd}$ row and $3^{rd}$ column. The image controller may identify the pixel of interest according to methodology described above in conjunction with the pixel of interest identification module 250 of FIG. 2.

Figure 5C:
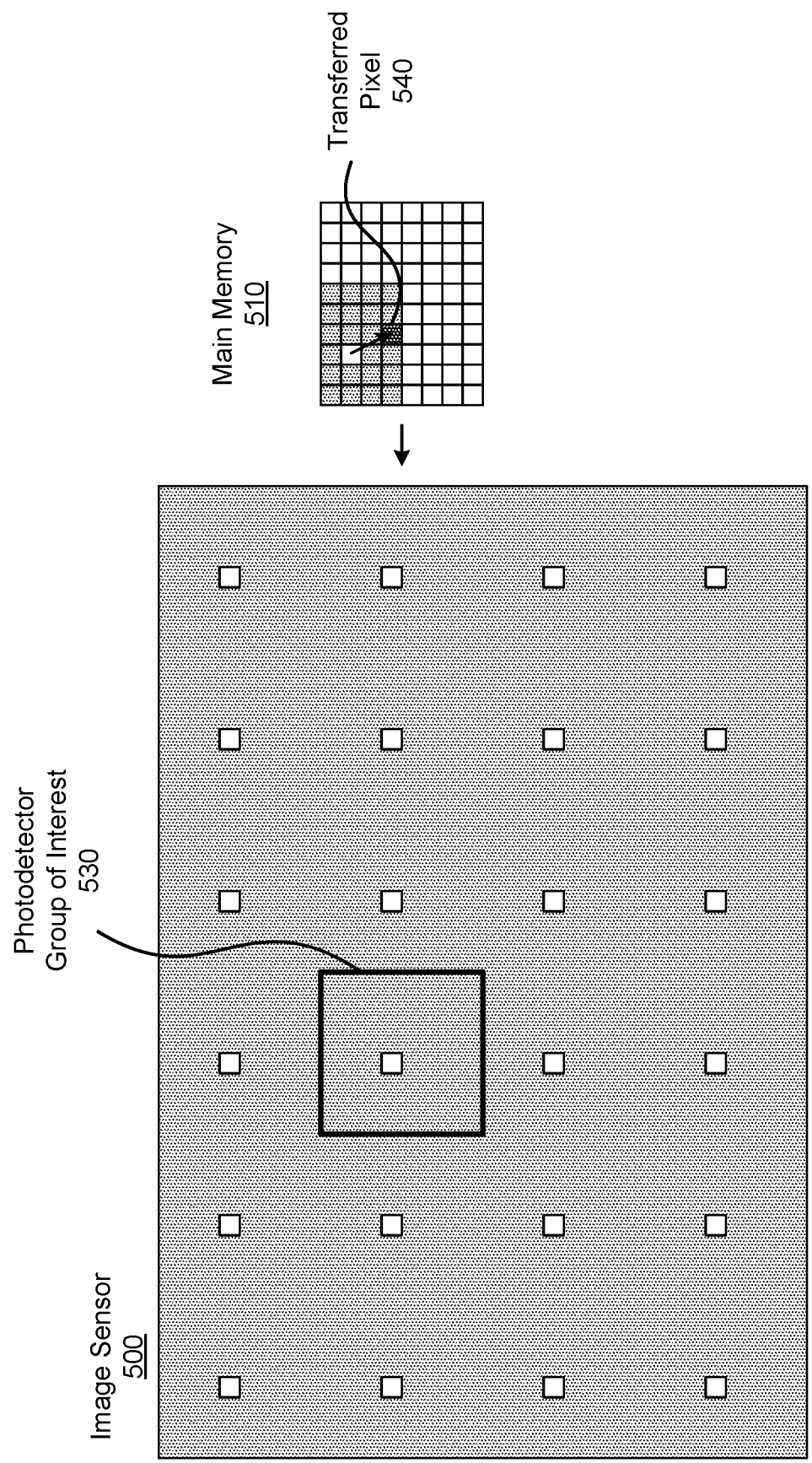
FIG. 5C illustrates the second implementation of region of interest sampling and retrieval, in particular transferring the pixel of interest, in accordance with one or more embodiments.

FIG. 5C illustrates the second implementation of region of interest sampling and retrieval, in particular transferring the pixel of interest 520, in accordance with one or more embodiments. The image controller transfers the pixel of interest 520 from position <2, 3> in the main memory 510 to position <4, 4> in the main memory 510, illustrated as transferred pixel 540, which corresponds to the position of the sample photodetector relative to its photodetector group. The image controller also identifies the photodetector group of interest 530 which corresponds to the location of the identified pixel of interest 520. In other words, the location of the pixel of interest 520 has coordinates <2, 3> relative to the other sample pixels which corresponds (or matches to) the photodetector group of interest 530 with coordinates <2, 3> relative to other photodetector groups. Apart from the transferred pixel 540, the image controller may clear the main memory 510.

Figure 5D:
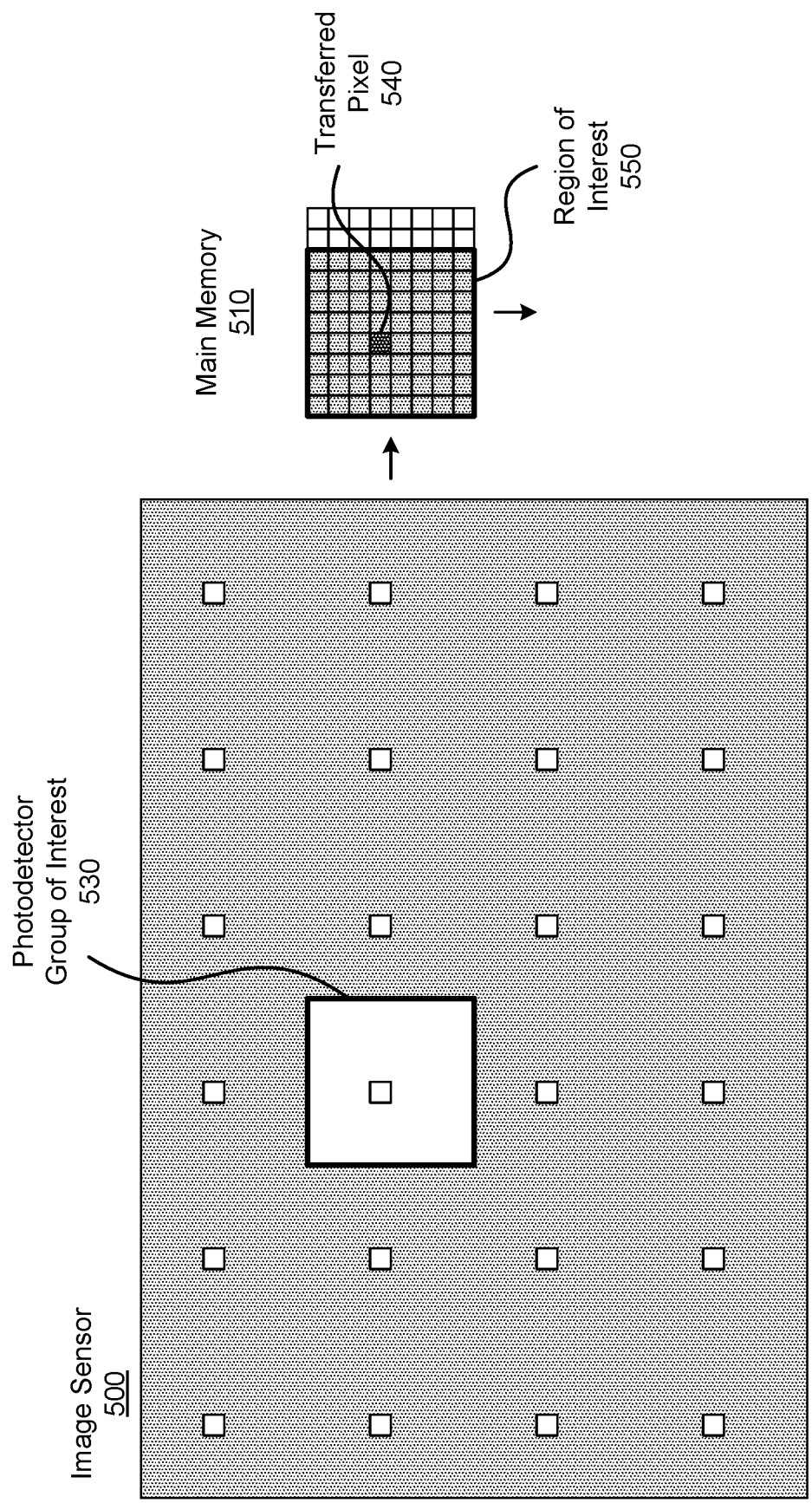
FIG. 5D illustrates the second implementation of region of interest sampling and retrieval, in particular accessing remaining pixels in a photodetector group of interest, in accordance with one or more embodiments.

FIG. 5D illustrates the second implementation of region of interest sampling and retrieval, in particular accessing remaining pixels in a photodetector group of interest 530, in accordance with one or more embodiments. During the second-access step, the image controller retrieves the remaining pixels in the photodetector group of interest 530 to the main memory 510. As the remaining pixels exclude pixel data of the sample photodetector in the image sensor 500, the pixel data of the remaining pixels fills the main memory pixels around the transferred pixel 540. In effect, the image controller has generated a high-resolution region of interest 550 combining pixel data from the transferred pixel 540 and the remaining pixels in the photodetector group of interest 530.

The high-resolution region of interest can be the size of the photodetector group, e.g., 8×8 pixels. According to this example illustration, the image controller reads out 4×6 sample pixels (24 sample pixels) during the first-access step and 8×8 pixels minus the sample photodetector (63 remaining pixels) during the second-access step. In sum, the image controller reads out 87 pixels of the total 1,563 pixels of the image sensor (~6% of the pixels). This saves computing resources and battery consumption by only pulling down the high-resolution region of interest rather than the full-resolution image captured by the image sensor (e.g., a cropped image of the user's eye rather than a full-size image of the user's face captured by the image sensor).

The image controller can then perform object tracking or transfer the high-resolution region of interest 550 to another computing device for further processing, e.g., for gaze estimation or other object tracking. The image controller can also clear all data from the image sensor 500 and the main memory 510 in preparation for another iteration of capturing an image and performing region of interest sampling and retrieval.

FIGS. 6A-6E illustrate a third implementation of region of interest sampling and retrieval, in accordance with one or more embodiments. In this third implementation, an imaging controller (e.g., the image controller 230 of FIG. 2) transfers a pixel of interest to a temporary memory 620 (e.g., as part of the memory 270 of FIG. 2) prior to retrieving the remaining pixels in photodetector group of interest.

Figure 6B:
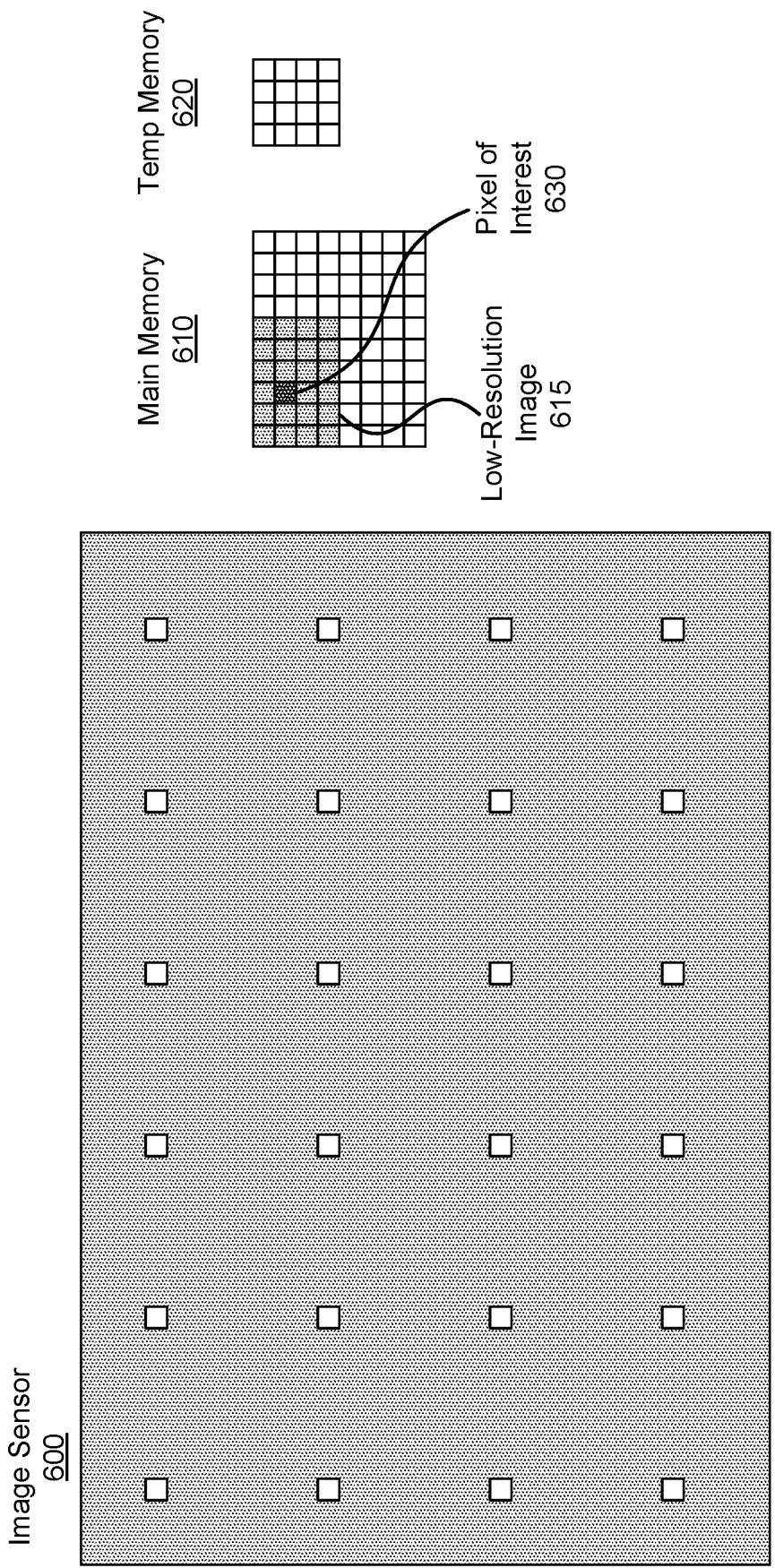
FIG. 6B illustrates the third implementation of region of interest sampling and retrieval, in particular identifying a pixel of interest, in accordance with one or more embodiments.

FIG. 6A illustrates a third implementation of region of interest sampling and retrieval, in particular sampling of photodetector groups, in accordance with one or more embodiments. In FIG. 6A, the image sensor 600 comprises 4×6 photodetector groups, wherein each photodetector group comprises 8×8 photodetectors. In total, the image sensor 600 comprises 32×48 photodetectors or 1,536 photodetectors. In other embodiments (not illustrated), the image sensor 600 may comprise a different number of photodetector groups, differently sized photodetector groups, different number of photodetectors, different dimensions, or some combination thereof. In a first-access step, the image controller retrieves samples pixels, i.e., pixel data for the sample photodetectors 605 (pointing to a representative sample photodetector in the image sensor 600) in the photodetector groups, and stores the sample pixels in the main memory 610, forming a low-resolution image 615. The main memory 610 may be sized accordingly to store the set of sample pixels retrieved during the first-access step and pixel data of at least one photodetector group. In other embodiments, the main memory 610 may be sized differently. The temporary memory 620 is separate and distinct from the main memory 610. In other embodiments, the temporary memory 620 may be part of the main memory 610. The temporary memory 620 may be sized smaller than the main memory 610, sufficiently to store at least a number of FIG. 6B illustrates the third implementation of region of interest sampling and retrieval, in particular identifying a pixel of interest 630, in accordance with one or more embodiments. The image controller identifies a pixel of interest 630, in the low-resolution image 615, from the sample pixels with the coordinates of <2, 3>, i.e., $2^{nd}$ row and $3^{rd}$ column. The image controller may identify the pixel of interest according to methodology described above in conjunction with the pixel of interest identification module 250 of FIG. 2.

Figure 6C:
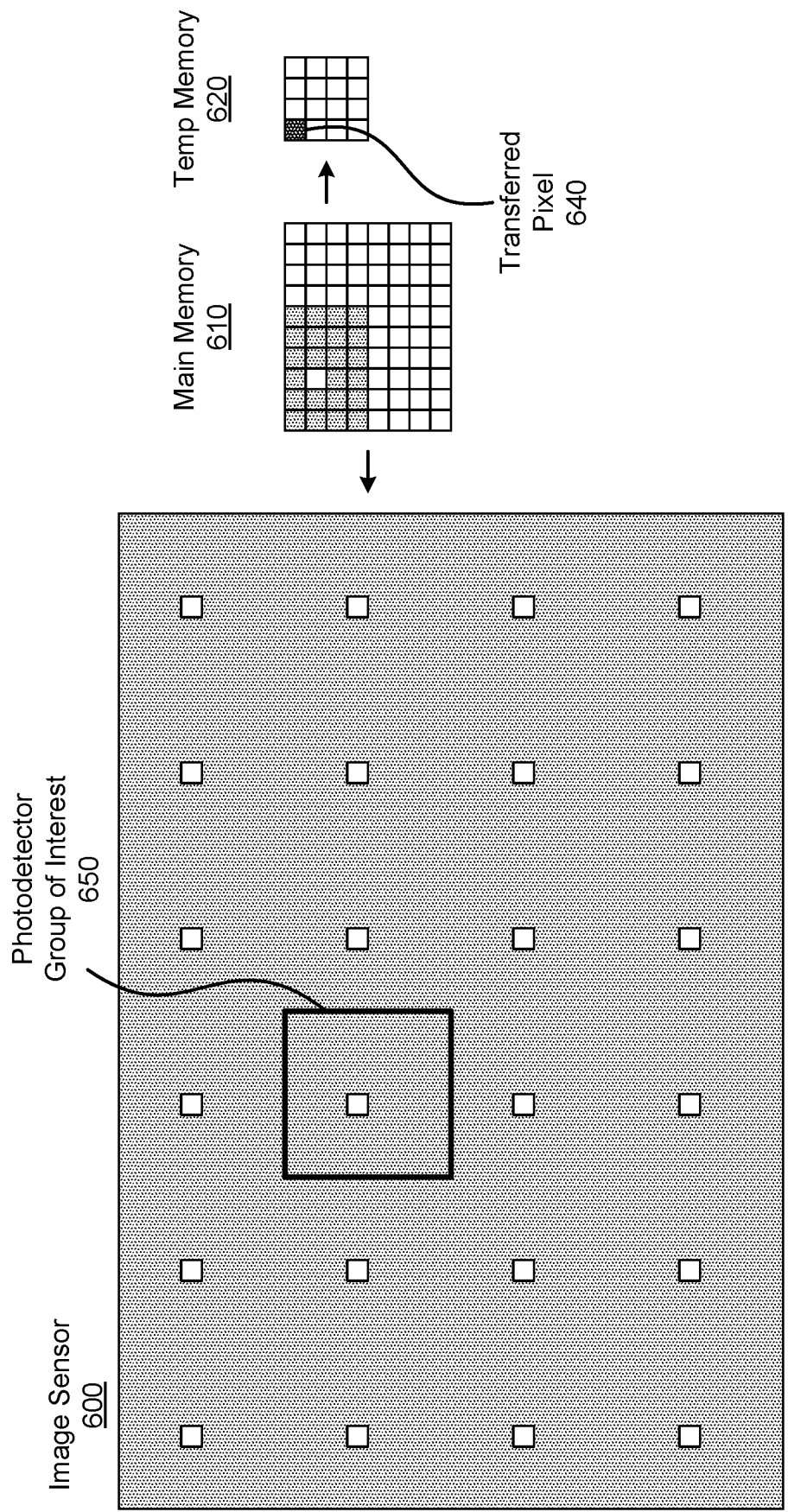
FIG. 6C illustrates the third implementation of region of interest sampling and retrieval, in particular transferring the pixel of interest to temporary memory, in accordance with one or more embodiments.

FIG. 6C illustrates the third implementation of region of interest sampling and retrieval, in particular transferring the pixel of interest 630 to temporary memory 620, in accordance with one or more embodiments. The image controller transfers the pixel data of the pixel of interest 630 from position <2, 3> in the main memory 610 to position <1, 1> in the temporary memory 620, illustrated as transferred pixel 640. In other embodiments, the transferred pixel 640 may be stored in other positions of the temporary memory 620. The image controller also identifies the photodetector group of interest 650 which corresponds to the location of the identified pixel of interest 630. In other words, the location of the pixel of interest 630 has coordinates <2, 3> relative to the other sample pixels and the photodetector group of interest 650 has coordinates <2, 3> relative to other photodetector groups. After transferring the pixel data of the pixel of interest 630 from the main memory 610 to the temporary memory 620, the image controller may clear the main memory 610.

Figure 6D:
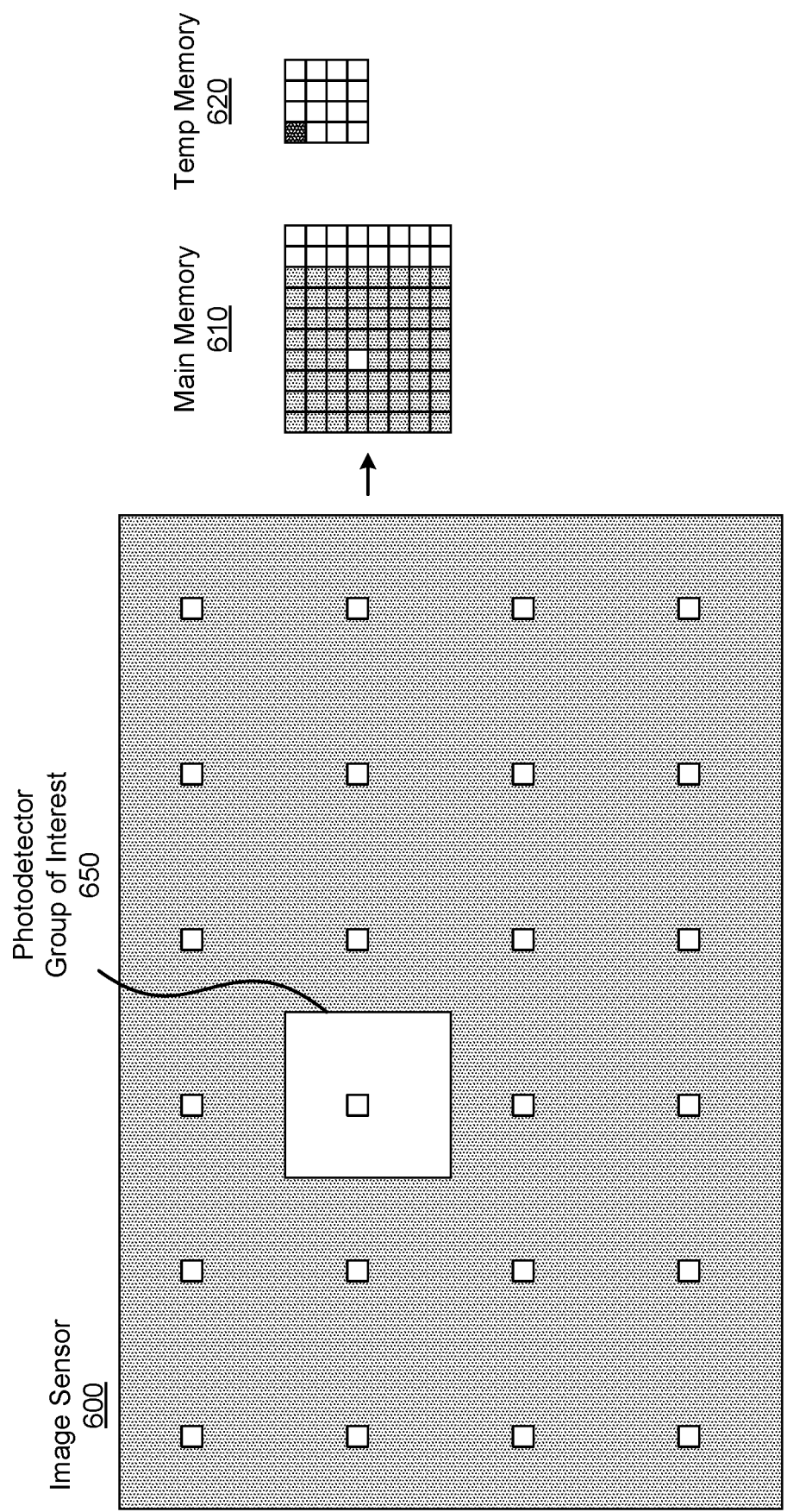
FIG. 6D illustrates the third implementation of region of interest sampling and retrieval, in particular accessing remaining pixels in a photodetector group of interest, in accordance with one or more embodiments.

FIG. 6D illustrates the third implementation of region of interest sampling and retrieval, in particular accessing remaining pixels in a photodetector group of interest, in accordance with one or more embodiments. During the second-access step, the image controller retrieves the remaining pixels in the photodetector group of interest 650 to the main memory 610. As the remaining pixels exclude re-accessing the sample photodetector, the pixel data of the remaining pixels fills the main memory 610 excluding the sample photodetector, i.e., with no pixel data at position <4, 4> in the main memory 610 which corresponds to the position of the sample photodetector relative to the photodetector group.

Figure 6E:
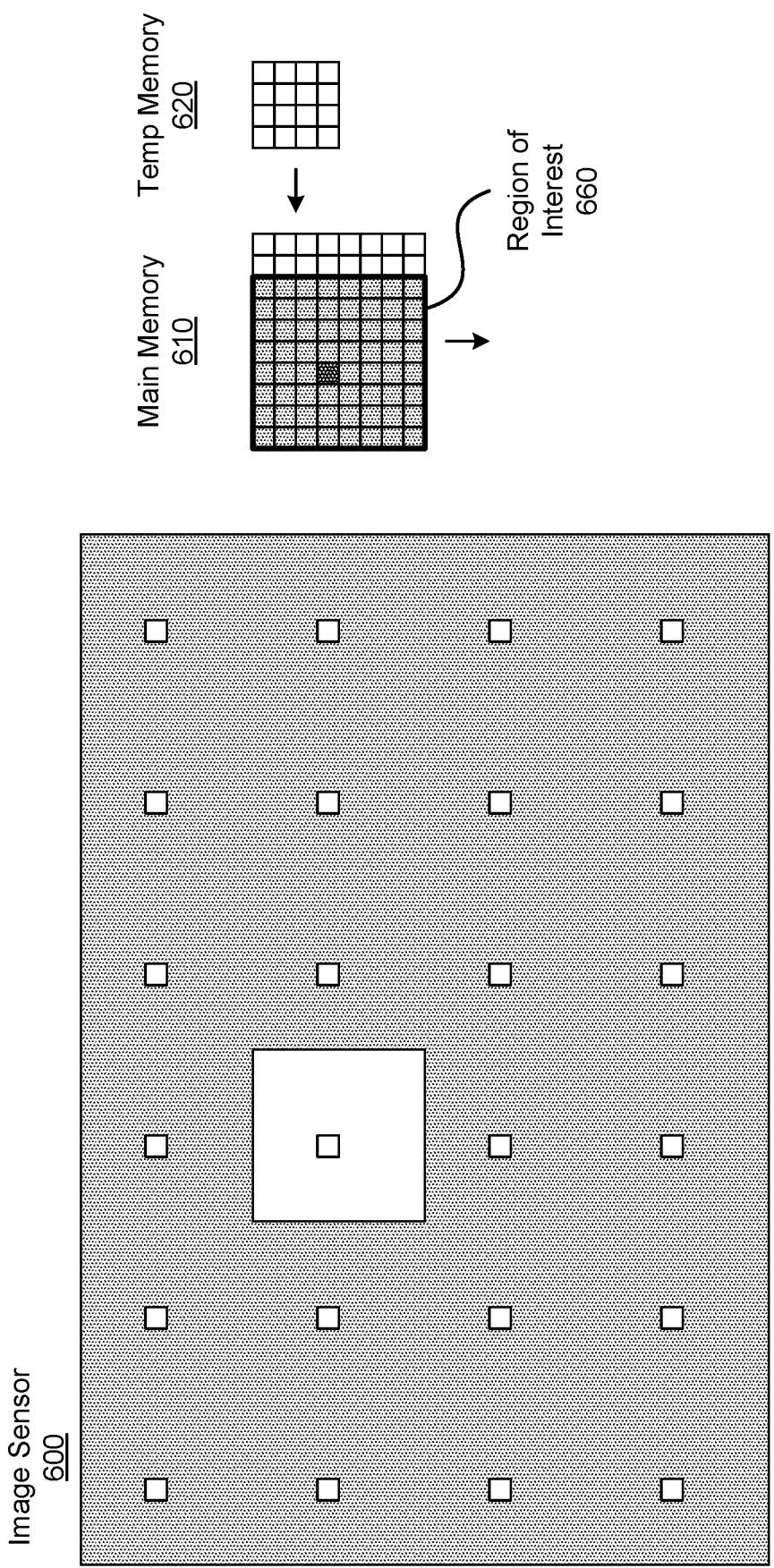
FIG. 6E illustrates the third implementation of region of interest sampling and retrieval, in particular transferring back the pixel of interest, in accordance with one or more embodiments.

FIG. 6E illustrates the third implementation of region of interest sampling and retrieval, in particular transferring back the pixel of interest 630 from the temporary memory 620, in accordance with one or more embodiments. The image controller transfers the transferred pixel 640 back from the temporary memory 620 to the main memory 610. The image controller transfers the pixel data to the position of the sample photodetector relative to the photodetector group. In this illustrative example, the image controller transfers the transferred pixel 640 to position <4, 4> in the main memory 610. Upon transferring back the transferred pixel 640, the image controller has generated the high-resolution region of interest 660.

The high-resolution region of interest can be the size of the photodetector group, e.g., 8×8 pixels. According to this example illustration, the image controller reads out 4×6 sample pixels (24 sample pixels) during the first-access step and 8×8 pixels minus the sample photodetector (63 remaining pixels) during the second-access step. In sum, the image controller reads out 87 pixels of the total 1,563 pixels of the image sensor (~6% of the pixels). This saves computing resources and battery consumption by only pulling down the high-resolution region of interest rather than the full-resolution image captured by the image sensor.

The image controller may perform object tracking or may transfer the high-resolution region of interest 660 for further processing by another computing unit, e.g., for gaze estimation or other object tracking. The image controller can also clear all data from the image sensor 600 and the main memory 610 in preparation for another iteration of capturing an image and performing region of interest sampling and retrieval.

Figure 7:
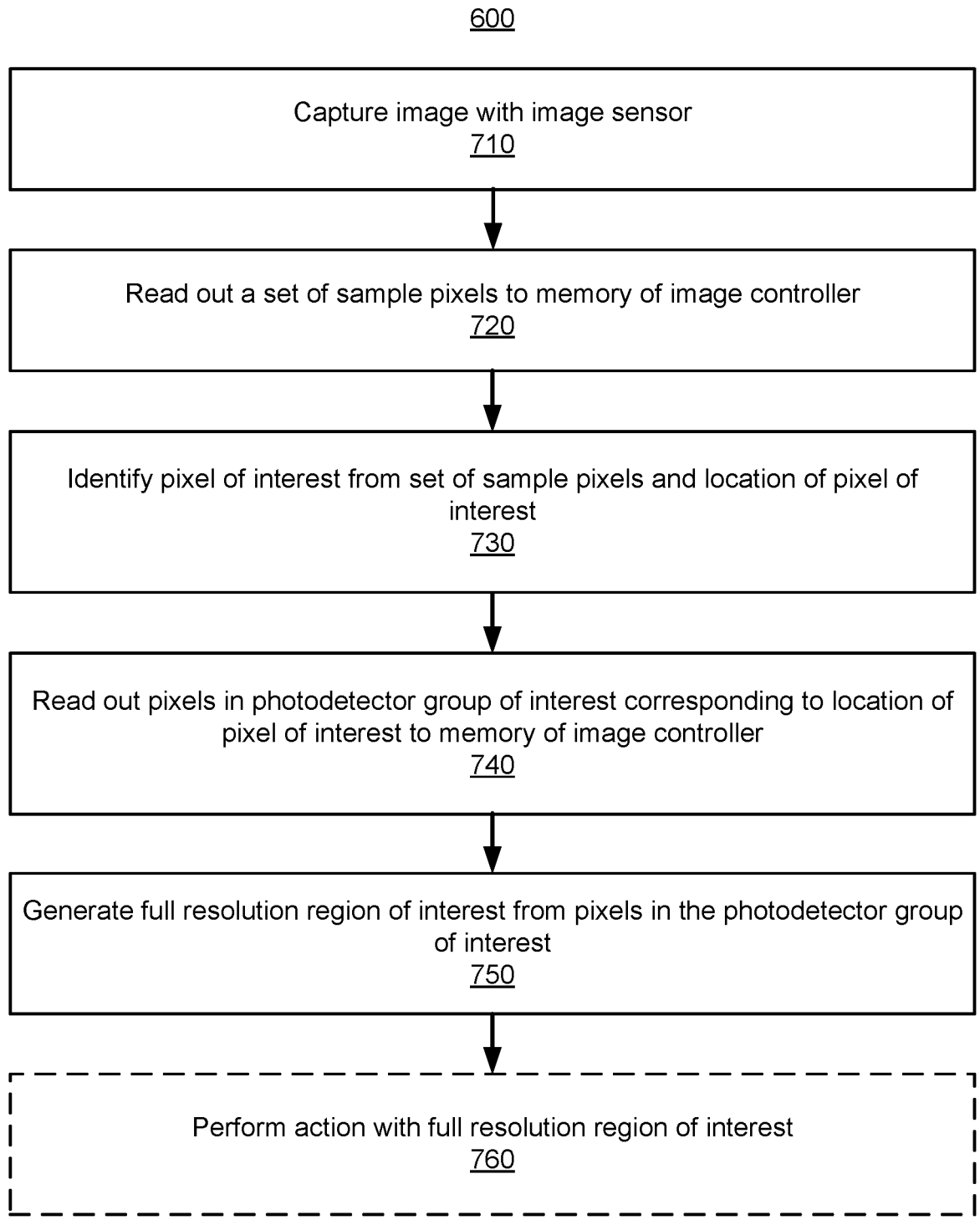
FIG. 7 is a flowchart illustrating a process for region of interest sampling and retrieval, in accordance with one or more embodiments.

FIG. 7 is a flowchart illustrating a process for region of interest sampling and retrieval, in accordance with one or more embodiments. The process shown in FIG. 7 may be performed by components of an imaging device (e.g., the imaging device 200). Other entities may perform some or all of the steps in FIG. 7 in other embodiments. Embodiments may include different and/or additional steps, or perform the steps in different orders. The embodiment of FIG. 7 describes generation a single high-resolution region of interest corresponding to a single identified pixel of interest. In other embodiments, the imaging device may identify multiple pixels of interest and may generate multiple high-resolution regions of interest.

The imaging device captures 710 an image with the image sensor. The imaging device captures an image by opening a shutter (physical or electronic) that causes an image sensor to convert incident light (e.g., directed by the optics block) into an electrical signal. The image sensor stores the electrical signals as pixels.

The imaging device reads out 720 a set of sample pixels to memory of the image controller. The set of sample pixels may comprise a sample pixel from each photodetector group of the image sensor. The set of sample pixels, in effect, is a low-resolution form of the image captured by the full image sensor. In some embodiments, photodetector groups of the image sensor may vary in size and/or dimension. In such embodiments, larger photodetector groups are more sparsely sampled with smaller photodetector groups being more densely sampled. This step may be referred to as a first-access step, wherein the imaging controller is sampling during this first instance of accessing the image sensor.

The imaging device identifies 730 a pixel of interest from the set of sample pixels and a location of the pixel of interest. The imaging device may identify the pixel of interest based on one or more selection criteria and/or a pattern recognition model. The selection criteria may be rule-based. For example, if a sample pixel's intensity is above or below a certain threshold, then the imaging device may determine the pixel to be a pixel of interest. As an example of a pattern recognition model, the pattern recognition model may be a machine-learned model trained to input the sample set of photodetectors (i.e., the low-resolution form of the image) to identify which of the sample set of photodetectors is a pixel of interest. In some embodiments, the imaging device identifies multiple pixels of interest. For example, in eye-tracking applications, the imaging device may capture images of a user's face. The imaging device may identify a first pixel of interest relating to one eye of the user and a second pixel of interest relating to the other eye of the user. With the identified pixel of interest, the imaging device also identifies the location of the pixel of interest relative to the set of sample pixels. For example, if the imaging device retrieved sample pixels from 6×8 photodetector groups, the coordinates for the location of the pixel of interest relative to other sample pixels can be expressed in coordinates ranging from [1, 6] for rows and [1, 8] for columns. Prior to reading out the remaining pixels of the photodetector group of interest corresponding to the pixel of interest, the imaging device may temporarily store the pixel of interest. In one embodiment, the imaging device transfers the pixel of interest to a corresponding position of a sample photodetector relative to the photodetector group (e.g., as described in FIGS. 5A-5D). In another embodiment, the imaging device transfers the pixel of interest to temporary memory that is separate from the main memory of the image controller (e.g., as described in FIGS. 6A-6E).

The imaging device reads out 740 pixels in a photodetector group of interest corresponding to the location of the pixel of interest to the memory of the image controller. With the location, the image controller accesses the image sensor at a second-access step to read out pixels in the photodetector group of interest. In some embodiments, the image controller may read out all the pixels in the photodetector group of interest (e.g., as embodied in FIGS. 4A-4D). In some embodiments, the image controller may read out the remaining pixels in the photodetector group of interest (e.g., as embodied in FIGS. 5A-5D and 6A-6E). The photodetector group of interest on the image sensor may be identified based on the location of the pixel of interest. With multiple pixels of interest, the imaging device may read out the pixels from each photodetector group of interest. The imaging device may refrain from re-accessing the sample photodetectors to avoid a noisy read-out of redundant data.

The imaging device generates 750 a high-resolution region of interest from pixels in the photodetector group of interest. In embodiments where the image controller reads out all pixels in the photodetector group of interest, the pixels read out in the second-access step form the high-resolution region of interest. In embodiments where the image controller refrains from re-accessing the sample photodetector, the imaging device combines the pixel of interest read-out during the first-access step and the remaining pixels of the photodetector group of interest read-out during the second-access step. The high-resolution region of interest is at the full-resolution of the image sensor. In embodiments with multiple pixels of interest, the imaging device may generate multiple high-resolution regions of interest by combining the respective pixel of interest in the photodetector group of interest and the respective remaining pixels in the photodetector group of interest.

In some embodiments, the second readout can include two-time accessed pixels as well as first-time accessed pixels. The image quality of the secondly accessed pixels may have been previously determined through an image sensor test during manufacture. In some embodiments, if the image quality is acceptable, the image controller does not generate the high-resolution image combining the first-readout pixels and the remaining pixels from the second readout. The image controller can just use the entire second readout pixels. If the image quality of the two-time accessed pixels is not acceptable, the image controller generates the good quality second readout, cropped higher resolution, image combining some of first readout pixels that are within the second ROI and some of the second readout pixels that are only first time accessed.

The imaging device may perform 760 an action with the high-resolution region of interest. The imaging device (or another computing device, e.g., as part of a DCA) may process the high-resolution region of interest. In one example application, the imaging device may perform object tracking with the high-resolution region of interest. The object may be an object of interest present in a field of view of the imaging device. The imaging device may periodically perform the method 700 to identify a position of the object in the field of view. The imaging device may further determine derivative characteristics, e.g., speed of the object, orientation of the object, occlusion of the object, etc. In another example application, the imaging device may perform gaze estimation using the high-resolution region of interest. The high-resolution region of interest may encompass an eye of the user. The imaging device may determine one or more characteristics of the user's eye based on the high-resolution region of interest. For example, the imaging device may determine eye position, eye movement, gaze, pupil dilation, vergence, another characteristic of the user's eye, or some combination thereof.

Figure 8:
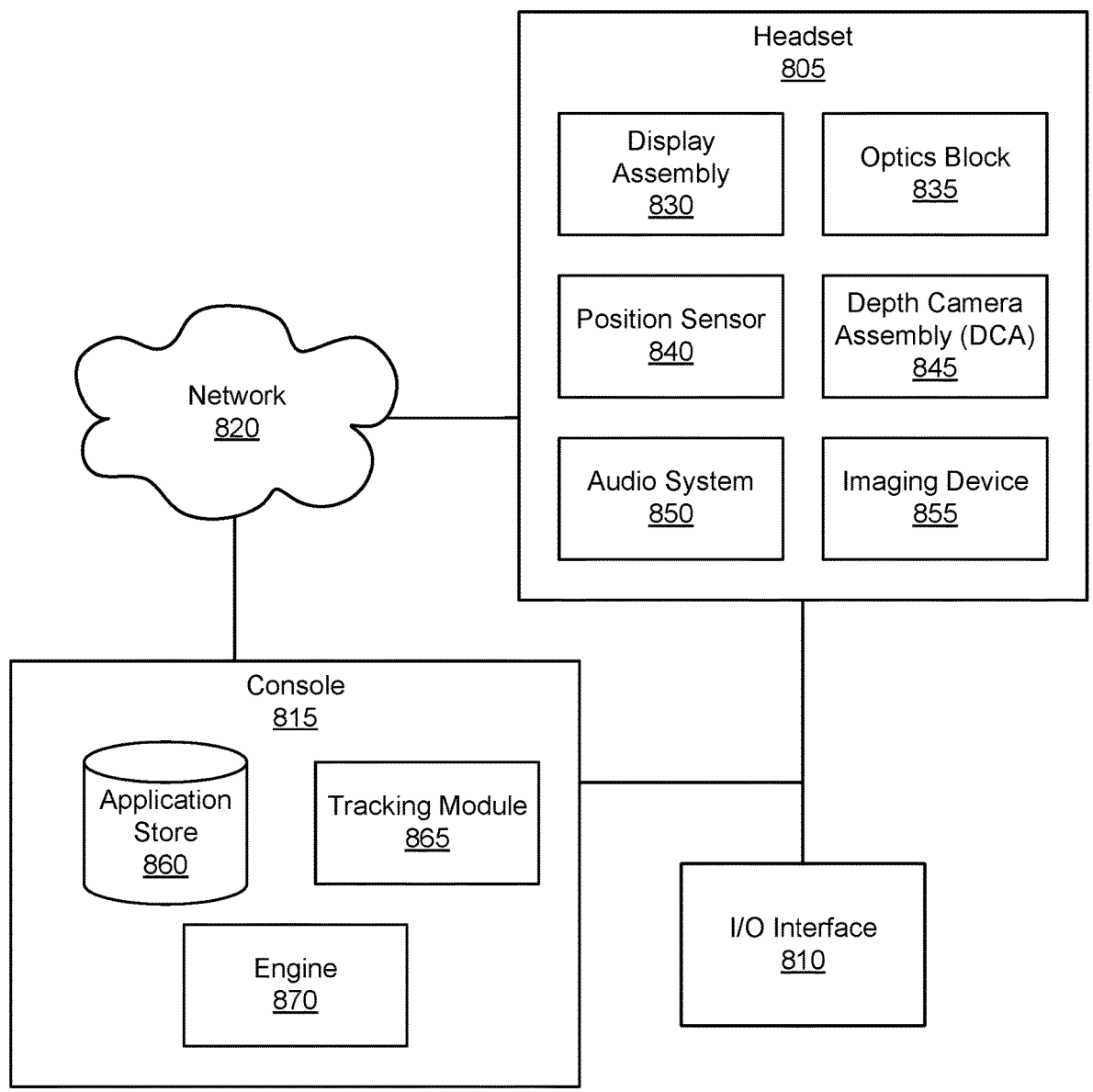
FIG. 8 is a system that includes a headset, in accordance with one or more embodiments.

In one or more embodiments, an imaging device may utilize region of interest sampling and retrieval in conjunction with a plurality of image sensors. In such embodiments, the imaging device may comprise a plurality of image sensors, e.g., each with its own optics block, positioned having different fields of view. The image controller may, during a first-access step, read out a set of sample pixels from each image sensor. The image controller may identify one or more pixels of interest from the sets of sample pixels from the image sensors. Upon identifying the pixel(s) of interest, the image controller may select a subset of the image sensors to read out pixels (e.g., pertaining to photodetector groups of interest) during the second-access step. The image controller generates the high-resolution region(s) of interest based on the pixel data read-out during the second-access step from the subset of image sensors. This implementation is advantageous in that an imaging device may sample the image sensors to identify a subset of the image sensors that have an optimal view of an object of interest. For example, in an eye-tracking application, the image sensor with the best view of the user's eyes at a given time can be selected for read-out of pixels in the second-access step. With the high-resolution region(s) of interest including the pixel data from the subset of image sensors, the image controller (or another computing device) may perform gaze estimation, etc. System Environment FIG. 8 is a system 800 that includes a headset 805, in accordance with one or more embodiments. In some embodiments, the headset 805 may be the headset 100 of FIG. 1A or the headset 105 of FIG. 1B. The system 800 may operate in an artificial reality environment (e.g., a virtual reality environment, an augmented reality environment, a mixed reality environment, or some combination thereof). The system 800 shown by FIG. 8 includes the headset 805, an input/output (I/O) interface 810 that is coupled to a console 815, and the network 820. While FIG. 8 shows an example system 800 including one headset 805 and one I/O interface 810, in other embodiments any number of these components may be included in the system 800. For example, there may be multiple headsets each having an associated I/O interface 810, with each headset and I/O interface 810 communicating with the console 815. In alternative configurations, different and/or additional components may be included in the system 800. Additionally, functionality described in conjunction with one or more of the components shown in FIG. 8 may be distributed among the components in a different manner than described in conjunction with FIG. 8 in some embodiments. For example, some or all of the functionality of the console 815 may be provided by the headset 805.

The headset 805 includes the display assembly 830, an optics block 835, one or more position sensors 840, and the DCA 845. Some embodiments of headset 805 have different components than those described in conjunction with FIG. 8. Additionally, the functionality provided by various components described in conjunction with FIG. 8 may be differently distributed among the components of the headset 805 in other embodiments, or be captured in separate assemblies remote from the headset 805.

The display assembly 830 displays content to the user in accordance with data received from the console 815. The display assembly 830 displays the content using one or more display elements (e.g., the display elements 120). A display element may be, e.g., an electronic display. In various embodiments, the display assembly 830 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 120 may also include some or all of the functionality of the optics block 835.

The optics block 835 may magnify image light received from the electronic display, corrects optical errors associated with the image light, and presents the corrected image light to one or both eyeboxes of the headset 805. In various embodiments, the optics block 835 includes one or more optical elements. Example optical elements included in the optics block 835 include: an aperture, a Fresnel lens, a convex lens, a concave lens, a filter, a reflecting surface, or any other suitable optical element that affects image light. Moreover, the optics block 835 may include combinations of different optical elements. In some embodiments, one or more of the optical elements in the optics block 835 may have one or more coatings, such as partially reflective or anti-reflective coatings.

Magnification and focusing of the image light by the optics block 835 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 835 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 835 corrects the distortion when it receives image light from the electronic display generated based on the content.

The position sensor 840 is an electronic device that generates data indicating a position of the headset 805. The position sensor 840 generates one or more measurement signals in response to motion of the headset 805. The position sensor 190 is an embodiment of the position sensor 840. Examples of a position sensor 840 include: one or more IMUS, one or more accelerometers, one or more gyroscopes, one or more magnetometers, another suitable type of sensor that detects motion, or some combination thereof. The position sensor 840 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 805 from the sampled data. For example, the IMU integrates the measurement signals received from the accelerometers over time to estimate a velocity vector and integrates the velocity vector over time to determine an estimated position of a reference point on the headset 805. The reference point is a point that may be used to describe the position of the headset 805. While the reference point may generally be defined as a point in space, however, in practice the reference point is defined as a point within the headset 805.

The DCA 845 generates depth information for a portion of the local area. The DCA includes one or more imaging devices and a DCA controller. The DCA 845 may also include an illuminator. Operation and structure of the DCA 845 is described above with regard to FIG. 1A.

The audio system 850 provides audio content to a user of the headset 805. The audio system 850 may comprise one or acoustic sensors, one or more transducers, and an audio controller. The audio system 850 may provide spatialized audio content to the user.

The acoustic parameters describe one or more acoustic properties (e.g., room impulse response, a reverberation time, a reverberation level, etc.) of the local area. The audio system 850 may provide information describing at least a portion of the local area from e.g., the DCA 845 and/or location information for the headset 805 from the position sensor 840. The audio system 850 may generate one or more sound filters using one or more of the acoustic parameters, and use the sound filters to provide audio content to the user.

The imaging device 855 captures images used by the artificial reality system. The imaging device 855 generally comprises an optics block, an image sensor, and an image controller. The imaging device 855 is an embodiment of the imaging device 200 of FIG. 2. The optics block directs light from an external environment onto the image sensor. The image sensor comprises a plurality of pixels (also referred to as photodetectors) that convert incident light into an electrical signal that is stored by the pixels. The image controller reads out the pixels (i.e., retrieves the pixel data stored by the pixels). The image controller may further comprise memory to store the pixel data read-out from the image sensor. In one or more embodiments, the imaging device is configured to capture images and to perform region of interest sampling and retrieval to generate a high-resolution region of interest (e.g., as described in FIGS. 2-6). The imaging device may perform actions with the high-resolution region of interest, e.g., object tracking (e.g., gaze estimation).

The I/O interface 810 is a device that allows a user to send action requests and receive responses from the console 815.

An action request is a request to perform a particular action. For example, an action request may be an instruction to start or end capture of image or video data, or an instruction to perform a particular action within an application. The I/O interface 810 may include one or more input devices. Example input devices include: a keyboard, a mouse, a game controller, or any other suitable device for receiving action requests and communicating the action requests to the console 815. An action request received by the I/O interface 810 is communicated to the console 815, which performs an action corresponding to the action request. In some embodiments, the I/O interface 810 includes an IMU that captures calibration data indicating an estimated position of the I/O interface 810 relative to an initial position of the I/O interface 810. In some embodiments, the I/O interface 810 may provide haptic feedback to the user in accordance with instructions received from the console 815. For example, haptic feedback is provided when an action request is received, or the console 815 communicates instructions to the I/O interface 810 causing the I/O interface 810 to generate haptic feedback when the console 815 performs an action.

The console 815 provides content to the headset 805 for processing in accordance with information received from one or more of: the DCA 845, the headset 805, and the I/O interface 810. In the example shown in FIG. 8, the console 815 includes an application store 860, a tracking module 865, and an engine 870. Some embodiments of the console 815 have different modules or components than those described in conjunction with FIG. 8. Similarly, the functions further described below may be distributed among components of the console 815 in a different manner than described in conjunction with FIG. 8. In some embodiments, the functionality discussed herein with respect to the console 815 may be implemented in the headset 805, or a remote system.

The application store 860 stores one or more applications for execution by the console 815. An application is a group of instructions, that when executed by a processor, generates content for presentation to the user. Content generated by an application may be in response to inputs received from the user via movement of the headset 805 or the I/O interface 810. Examples of applications include: gaming applications, conferencing applications, video playback applications, or other suitable applications.

The tracking module 865 tracks movements of the headset 805 or of the I/O interface 810 using information from the DCA 845, the one or more position sensors 840, or some combination thereof. For example, the tracking module 865 determines a position of a reference point of the headset 805 in a mapping of a local area based on information from the headset 805. The tracking module 865 may also determine positions of an object or virtual object. Additionally, in some embodiments, the tracking module 865 may use portions of data indicating a position of the headset 805 from the position sensor 840 as well as representations of the local area from the DCA 845 to predict a future location of the headset 805. The tracking module 865 provides the estimated or predicted future position of the headset 805 or the I/O interface 810 to the engine 870.

The engine 870 executes applications and receives position information, acceleration information, velocity information, predicted future positions, or some combination thereof, of the headset 805 from the tracking module 865. Based on the received information, the engine 870 determines content to provide to the headset 805 for presentation to the user. For example, if the received information indicates that the user has looked to the left, the engine 870 generates content for the headset 805 that mirrors the user's movement in a virtual local area or in a local area augmenting the local area with additional content. Additionally, the engine 870 performs an action within an application executing on the console 815 in response to an action request received from the I/O interface 810 and provides feedback to the user that the action was performed. The provided feedback may be visual or audible feedback via the headset 805 or haptic feedback via the I/O interface 810.

The network 820 couples the headset 805 to the console 815. The network 820 may include any combination of local area and/or wide area networks using both wireless and/or wired communication systems. For example, the network 820 may include the Internet, as well as mobile telephone networks. In one embodiment, the network 820 uses standard communications technologies and/or protocols. Hence, the network 820 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 820 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 820 can be represented using technologies and/or formats including image data in binary form (e.g., Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (Ipsec), etc.

One or more components of system 800 may contain a privacy module that stores one or more privacy settings for user data elements. The user data elements describe the user or the headset 805. For example, the user data elements may describe a physical characteristic of the user, an action performed by the user, a location of the user of the headset 805, a location of the headset 805, an HRTF for the user, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The system 800 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
capturing an image of a portion of a face of a user with an image sensor of an imaging device;
as part of a first access of the image captured by the image sensor, reading out a set of sample pixels, from the image sensor to main memory of an image controller;
identifying, via the image controller, a pixel of interest from the set of sample pixels and a location of the pixel of interest;
as part of a second-access of the image captured by the image sensor, reading out remaining pixels in a photodetector group of interest corresponding to the location of the pixel of interest from the image sensor to the main memory of the image controller;
generating, via the image controller, a high-resolution region of interest by combining the pixel of interest and the remaining pixels in the photodetector group of interest; and
performing, via the image controller, gaze estimation using the high-resolution region of interest.

2. The method of claim 1, wherein each sample pixel is captured by a sample photodetector of each of a plurality of photodetector groups, wherein the plurality of photodetector groups subdivide the image sensor.

3. The method of claim 2, wherein each photodetector group of the plurality of photodetector groups is of uniform dimensions.

4. The method of claim 2, wherein a first photodetector group of the plurality of photodetector groups is larger than a second photodetector group of the plurality of photodetector groups.

5. The method of claim 2, wherein the sample photodetector of each photodetector group is in a corresponding position relative to the photodetector group, the method further comprising:
prior to reading out the remaining pixels in the photodetector group of interest corresponding to the location of the pixel of interest, from the image sensor to the main memory of the image controller, transferring the pixel of interest into the corresponding position of the sample photodetector relative to the photodetector group in the main memory of the image controller.

6. The method of claim 1, wherein identifying the pixel of interest comprises applying a pattern recognition model to the set of sample pixels to identify the pixel of interest.

7. The method of claim 6, wherein the pattern recognition model is a machine-learned model trained to identify an eye of the user from the set of sample pixels.

8. The method of claim 1, further comprising:
prior to reading out the remaining pixels in the photodetector group of interest corresponding to the location of the pixel of interest, from the image sensor to the main memory of the image controller, transferring the pixel of interest into temporary memory of the image controller that is separate from the main memory of the image controller,
wherein generating the high-resolution region of interest comprises transferring the pixel of interest from the temporary memory to the main memory of the image controller.

9. The method of claim 1, wherein the high-resolution region of interest describes an eye of the user.

10. The method of claim 1, further comprising:
identifying, via the image controller, a second pixel of interest from the set of sample pixels and a location of the second pixel of interest;
reading out remaining pixels in a second photodetector group of interest corresponding to the location of the second pixel of interest, from the image sensor to the main memory of the image controller; and
generating, via the image controller, a second high-resolution region of interest by combining the second pixel of interest and the remaining pixels in the second photodetector group of interest,
wherein performing the gaze estimation is based in part on the high-resolution region of interest the second high-resolution region of interest.

11. An imaging device comprising:
an image sensor comprising a plurality of photodetectors and configured to capture an image of a portion of a face of a user; and
an image controller configured to:
as part of a first access of the image captured by the image sensor, read out a set of sample pixels, from the image sensor to main memory;
identify a pixel of interest from the set of sample pixels and a location of the pixel of interest;
as part of a second-access of the image captured by the image sensor, read out remaining pixels in a photodetector group of interest corresponding to the location of the pixel of interest, from the image sensor to the main memory;
generate a high-resolution region of interest by combining the pixel of interest and the remaining pixels in the photodetector group of interest; and
perform gaze estimation using the high-resolution region of interest.

12. The imaging device of claim 11, wherein the image sensor is subdivided into a plurality of photodetector groups, and wherein each sample pixel is captured by a sample photodetector of each photodetector group.

13. The imaging device of claim 12, wherein each photodetector group of the plurality of photodetector groups is of uniform dimensions.

14. The imaging device of claim 12, wherein a first photodetector group of the plurality of photodetector groups is larger than a second photodetector group of the plurality of photodetector groups.

15. The imaging device of claim 12, wherein the sample photodetector of each photodetector group is in a corresponding position relative to the photodetector group, and wherein the image controller is further configured to:
prior to the read out of the remaining pixels in the photodetector group of interest corresponding to the location of the pixel of interest, from the image sensor to the main memory of the image controller, transfer the pixel of interest into the corresponding position of the sample photodetector relative to the photodetector group in the main memory.

16. The imaging device of claim 11, wherein the image controller is configured to:
apply a pattern recognition model to the set of sample pixels to identify the pixel of interest.

17. The imaging device of claim 16, wherein the pattern recognition model is a machine-learned model trained to identify an eye of the user from a sample set of photodetectors.

18. The imaging device of claim 11, wherein the high-resolution region of interest describes an eye of the user.

19. The imaging device of claim 11, wherein the image controller is further configured to:
identify a second pixel of interest from the set of sample pixels and a location of the second pixel of interest;
read out remaining pixels in a second photodetector group of interest corresponding to the location of the second pixel of interest, from the image sensor to the main memory; and
generate a second high-resolution region of interest by combining the second pixel of interest and the remaining pixels in the second photodetector group of interest;
wherein the image controller is further configured to perform the gaze estimation based in part on the high-resolution region of interest and the second high-resolution region of interest.

20. A non-transitory computer-readable medium having stored thereon instructions that when executed by a processor cause an imaging device to:
capture an image of a portion of a face of a user with an image sensor of an imaging device;
as part of a first access of the image captured by the image sensor, read out a set of sample pixels, from the image sensor to main memory of an image controller;
identify, via the image controller, a pixel of interest from the set of sample pixels and a location of the pixel of interest;
as part of a second access of the image captured by the image sensor, read out pixels in a photodetector group of interest corresponding to the location of the pixel of interest from the image sensor to the main memory of the image controller, wherein the pixels in the photodetector group form a high-resolution region of interest; and
perform, via the image controller, gaze estimation using the high-resolution region of interest.

* * * * *